(12) United States Patent
Saito

(10) Patent No.: US 12,105,397 B2
(45) Date of Patent: Oct. 1, 2024

(54) OPTICAL MODULATOR, OPTICAL RECEIVER, CONVERSION DEVICE, SPIN ORBITAL DIRECT PRODUCT STATE GENERATION DEVICE, AND QUANTUM COMPUTER

(71) Applicant: Hitachi, Ltd., Tokyo (JP)

(72) Inventor: Shinichi Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 525 days.

(21) Appl. No.: 17/514,083

(22) Filed: Oct. 29, 2021

(65) Prior Publication Data

US 2022/0171251 A1 Jun. 2, 2022

(30) Foreign Application Priority Data

Nov. 27, 2020 (JP) ................................. 2020-196726

(51) Int. Cl.
*G02F 1/21* (2006.01)
*G02F 1/225* (2006.01)
*H01S 3/067* (2006.01)
*H04B 10/61* (2013.01)

(52) U.S. Cl.
CPC ............ *G02F 1/212* (2021.01); *G02F 1/2252* (2013.01); *H01S 3/06712* (2013.01); *H04B 10/613* (2013.01)

(58) Field of Classification Search
CPC .... G02F 1/212; G02F 1/2252; H01S 3/06712; H04B 10/613

USPC ......................................................... 359/279
See application file for complete search history.

(56) References Cited

U.S. PATENT DOCUMENTS

2017/0199036 A1 7/2017 Moxley, III
2020/0133034 A1 4/2020 Schrans et al.

OTHER PUBLICATIONS

Shinichi Saito et al., "Si photonic waveguides with broken symmetries: applications from modulators to quantum simulations", Japanese Journal of Applied Physics 59, SO0801; Apr. 28, 2020.

*Primary Examiner* — William Choi
(74) *Attorney, Agent, or Firm* — MATTINGLY & MALUR, PC

(57) ABSTRACT

An optical modulator includes first and second waveguides; a first phase shifter provided in at least one of the first and second waveguides and configured to control a phase of the laser beam; a first optical element configured to combine the laser beam propagating through the first waveguide and the laser beam propagating through the second waveguide and separate the combined laser beam into two laser beams; a third (fourth) waveguide on which one (the other) of the laser beams separated by the first optical element is incident; a second phase shifter provided in at least one of the third and fourth waveguides and configured to control a phase of the laser beam; and a second optical element configured to combine the laser beam propagating through the third waveguide and the laser beam propagating through the fourth waveguide and emit the laser beam in the superposition state.

19 Claims, 14 Drawing Sheets

OPTICAL MODULATOR, OPTICAL RECEIVER, CONVERSION DEVICE, SPIN ORBITAL DIRECT PRODUCT STATE GENERATION DEVICE, AND QUANTUM COMPUTER

CROSS-REFERENCE TO RELATED APPLICATION

This application claims priority to Japanese Patent Application No. 2020-196726 filed on Nov. 27, 2020, the entire contents of which are incorporated by reference herein.

BACKGROUND OF THE INVENTION

1. Field of the Invention

The present invention relates to an optical modulator, an optical receiver, a conversion device, a spin orbital direct product state generation device, and a quantum computer.

2. Description of Related Art

Advances in computers invented in the 20th century are impressive and integration of transistors has increased exponentially in accordance with the Moore's law. The integration of transistors has already exceeded 10 billion per chip, and thus exceeded the number of neurons included in human brains. With advances in computers, a communication capacity in which information is exchanged between computers has also increased exponentially.

In large-capacity communication, a scheme of loading information on a laser beam and transferring the information using an optical fiber is superior. According to the Einstein's theory of relativity, it is not possible to send information more quickly than light based on the principle of physics. Therefore, transmission of information using light is means for transmitting information at a highest speed. Since photons (light particles) propagating through an optical fiber have no charge, electrical resistance is not caused during the propagation unlike electrons. In this way, light can send a large amount of information quickly with relatively low power consumption.

To load information on light, it is necessary to convert digital information (1 or 0) into a light state in accordance with certain means. A simplest method is a method of switching between ON and OFF of a semiconductor laser to modulate intensity of a laser beam oscillating in the semiconductor laser directly in accordance with digital information. This is a very simple method, but a laser may not become stable and a transmission speed arrives at a limit of about 10 Gbps. In contrast, in a semiconductor laser, a coherent laser beam can be modulated at a high speed by a switch (called a modulator) that oscillates light with given intensity and changes intensity of the light. For example, intensity of light can be changed by interfering a laser beam of which a phase is modulated at a high speed using a Mach Zehnder (MZ) interferometer. Alternatively, intensity of light can also be modulated with an electro-optic (hereinafter abbreviated to EO) modulator using an effect of absorbing light (an EO effect). At present, an optical modulator capable of performing modulation at a speed of 100 Gbps has been put into practical use.

With advances in optical information communication, however, a sufficient amount of information may not be sent in direct intensity modulation of these optical modulators. Accordingly, it is general to use wavelength division multiplexing (WDM) in which the degree of freedom of light colors, that is, light with different wavelengths, are multiplexed in one optical fiber to transmit information. In a dense WDM (DWDM) scheme, multiplexing of 100 or more waves has been put into practical use.

Further, when sufficient information may not be sent with only WDM, a complex modulation scheme such as a differential quadrature phase shift keying (DQPSK) or dual polarization quadrature phase shift keying (DP-QPSK) in which the degree of polarization freedom or the degree of phase freedom of light is used is also used.

In this way, to load information on light, intensity (ON/OFF) wavelength (color), polarization (vibration directions), amplitude (not simply ON or OFF but multi-value intensity modulation), phases (shifts of vibration timings between bits), and the like of light, have been used in the related art. However, the use of the degrees of freedoms reaches a limit, and thus it is any more difficult to increase an amount of information loaded on light.

However, as well as information transmission, arithmetic capability of a computer also reaches a limit. As described above, the Moore's law has been a guidance principle over about half a century. According to the Moore's law, integration of transistors integrated in a silicon chip has doubled for 3 years, and thus a processing speed of the chip was supposed to double. However, over the past 10 years, a speed of a CPU which is a central processing unit of a computer remained high about 5 GHz, and evolution does not proceed.

One of the major causes for inhibiting a processing capability of a computer from increasing is heating. When information is processed, a computation result can be obtained. However, randomness measured in accordance with a physical quantity called entropy is increased to that extent. As a result, Joule's heat is generated. This is caused because a so-called classical computer much uses an irreversible process in computation, and a limit is reached for this scheme.

To solve this heating problem and obtain an overwhelming computing capability, quantum computers have been actively researched and developed worldwide. Since quantum computers perform computation through a reversible process (unitary computation), an increase in entropy does not occur unlike classical computers. Therefore, because of parallel computing in which the principle of superposition of quantum mechanics is used, as well as suppressing power consumption, exponential high speed computation can be achieved compared to classical computers.

Incidentally, it is very difficult to make hardware of a quantum computer. This is because it is difficult to make and control a device in a minimum unit, which is called a quantum bit, that operates information used by a quantum computer and has high performance. The reason is that, in a quantum bit, it is necessary to realize a superposition state of the quantum mechanics between 1 and 0 and it is difficult to stably realize the superposition state.

As candidates for the quantum bit, a single electron, a single photon, electron spin, nuclear spin, ion, superconductivity, or the like has been examined. For any quantum, it is necessary to operate a very minute physical quantity, and thus it is very difficult to realize and measure the state. For example, as proposed in US-A-2017/199036, superfluidity of an exciton state is controlled by photon vortexes. However, since a phase of light and amplitude of the light are controlled in other waveguides, a quantized state in which both the phase and the amplitude are controlled may not be realized. In US-A-2017/199036, a method of controlling many quantum bits is not disclosed. In US-A-2020/133034, a polarization rotator that has a very complicated structure is introduced to control a TE mode and TM mode orthogonal to each other with the same optical integrated circuit. Therefore, a polarization state cannot be changed to any polarization state quietly freely and dynamically.

SUMMARY OF THE INVENTION

As described above, for either large-capacity optical communication or computation of classical computers, technologies of the related art have reached limits. The problems of both the large-capacity optical communication and computation of classical computers are closely related, and thus a superposition state of quantum mechanics cannot be generated efficiently and stably. In methods of the related arts in which a superposition state of quantum mechanics is generated, it is very difficult to realize more than the superposition state and a minute quantized state cannot be maintained stably for a longtime although the minute quantized state can be realized. This is because integration of a quantum computer is interfered. To realize a practical quantum computer, it is necessary to increase the number of digits from the current level which does not reach 100 quantum bits.

An objective of the present invention is to provide a basic device of a large-capacity optical communication or a quantum computer which causes an angular momentum of light to carry information and realizes superposition states of different optical angular momentum states.

According to an aspect of the present invention, an optical modulator generates a coherent laser beam in a superposition state of two orthogonal angular momentum states. The optical modulator includes: a first waveguide; a second waveguide; a first phase shifter provided in one or both of the first and second waveguides and configured to control a phase of the laser beam incident on the waveguide; a first optical element configured to combine the laser beam propagating through the first waveguide and the laser beam propagating through the second waveguide and separate the combined laser beam into two laser beams; a third waveguide on which one of the laser beams separated by the first optical element is incident; a fourth waveguide on which the other of the laser beams separated by the first optical element is incident; a second phase shifter provided in one or both of the third and fourth waveguides and configured to control a phase of the laser beam incident on the waveguide; and a second optical element configured to combine the laser beam propagating through the third waveguide and the laser beam propagating through the fourth waveguide and emit the laser beam in the superposition state of the two orthogonal angular momentum states.

A superposition state of orthogonal angular momentum states of light is realized as a macro quantized state and information in many different angular momentum states can be sent inside one optical fiber. The superposition states of the orthogonal angular momentum states are formed as quantum bits, and thus the quantum bits that have a macro number of photons are realized. Thus, it is possible to realize a quantum computer in which many quantum bits are integrated.

Other tasks and novel characteristics will be apparent from description of the present specification and the appended drawings.

DESCRIPTION OF EMBODIMENTS

Figure 1:
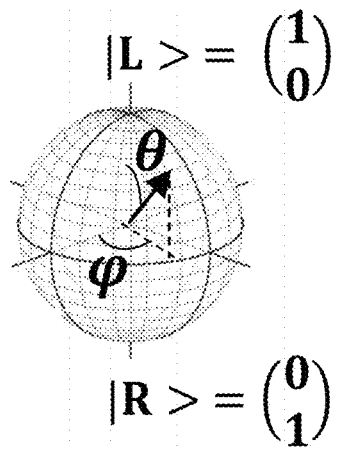
FIG. 1 is a diagram illustrating a quantized state of quantum bits in a Poincare sphere (Bloch sphere)

In the embodiment, states are expressed by angular momenta which are the degrees of internal freedom or the degrees of quantum freedom of light. Angular momenta of light include a spin angular momentum derived from polarization rotation and an orbital angular momentum derived from rotation of a phase of vibration of an electromagnetic field. Light that has the orbital angular momentum is also referred to as an optical vortex. The present invention includes aspects of both a case in which a spin angular momentum is used and a case in which an orbital angular momentum is used, as angular momenta expressing states. Hereinafter, unless otherwise mentioned, a principle of the present invention will be described based on orbital angular momenta.

For orbital angular momentum states of light, a sinistral quantized vortex state (hereinafter referred to as a left vortex state) is expressed as Equation (1) and a dextrorse quantized vortex state (hereinafter referred to as a right vortex state) is expressed as Equation (2). To cause such quantized states to be orthogonal to each other, an inner product is 0 as shown in Equation (3). This indicates that a quantized vortex of light can be expressed with bits of 0 and 1 of digital information.

$$|L>=\begin{pmatrix}1\\0\end{pmatrix} \quad (1)$$

$$|R\rangle = \begin{pmatrix} 0 \\ 1 \end{pmatrix} \quad (2)$$

$$\langle L | R \rangle = 0 \quad (3)$$

The two states are different states of quantum mechanics and can be clearly distinguished because the states are orthogonal to each other. Further, the inventors have found that the optical vortex state is shown in a single photon and is also shown in a coherent laser beam indicating coherence. The inventors have mathematically proved that a quantized vortex state includes a macro quantized state which can be observed as a behavior of coherent light and is a state expressed in Equation (1) or Equation (2) by applying the quantum multi-body theory to a coherent laser beam.

According to the knowledge, when two different states of quantum mechanics are realized by coherent light of the left vortex state and coherent light of the right vortex state, a superposition state of both the states can be realized. The superposition state of the two states can be expressed using a zenith angle $\theta$ and a deflection angle $\phi$ (see FIG. 1) which are two angles Equation (4).

$$|\theta, \phi\rangle = \begin{pmatrix} e^{-i\frac{\phi}{2}} \cos\left(\frac{\theta}{2}\right) \\ e^{i\frac{\phi}{2}} \sin\left(\frac{\theta}{2}\right) \end{pmatrix} \quad (4)$$

Based on Equation (4), it is possible to configure a modulator (optical vortex modulator) that realizes any superposition state of a left vortex state (for example, indicating 0 of digital information) and a right vortex state (for example, indicating 1 of the digital information). Equation (4) means that coherent light in the left vortex state and coherent light in the right vortex state are distributed with amplitudes of cos ($\theta$/2) and sin ($\theta$/2). This can be checked from each probability is a squared value (cos$^2$($\theta$/2) and sin$^2$($\theta$/2)) because Equation (4) is a wave function. Equation (4) is normalized so that a sum of the probabilities is 1. However, in the case of the modulator according to the present invention, the quantized state of the coherent laser beam is accurately normalized to the photon number included in bits. That is, the photons included in the coherent laser beam are condensed to the same wavelength, energy, polarization, orbital angular momentum state by the Bose-Einstein condensation, and thus take the completely same state. Characteristics of the modulator according to the present invention are that the superposition state of "1" and "0" of digital information is realized for the macro quantized state.

On the other hand, for a phase part of Equation (4), a phase difference occurs by +$e^{i\phi}$ in the right vortex with respect to the left vortex because signs are different between the left vortex state and the right vortex state.

Accordingly, the state of Equation (4) can be realized by setting an amplitude ratio of the coherent laser beam in the left vortex state to the coherent laser beam in the right vortex state to a desired ratio determined by the zenith angle and superposing a phase difference determined by the deflection angle to the both.

From the above description, it can be known that the modulator according to the present invention can realize a quantized state of a coherent laser beam functioning as quantum bits. That is, a state expressed with Equation (4) can be described by vectors oriented from the origin to a spherical surface of the Bloch sphere known as a notation system of quantum bits. The inventors have noticed that a Poincare sphere used to express a polarized state of light in fields of optics is actually a Bloch sphere. A difference between the spheres is a length of the vector. In the Bloch sphere, it is assumed that a quantized state is formed from a single spin and a sphere normally has a radius of 1. In the Poincare sphere, however, a radius is N times a macro number to correspond to a photon number N included in bits. This corresponds to the fact that a Dirac constant (h/2$\pi$) obtained by dividing the Planck constant h known as a constant indicating a quantized state by 2$\pi$ effectively becomes N times (N(h/2$\pi$)), in other words, indicates that the macro quantized state is realized.

Hereinafter, embodiments of the present invention will be described with reference to the drawings. The embodiments are merely exemplary, and materials, conductive types, shapes, and the like to be used can be modified variously. Device structures described in the embodiments can also be combined or substituted. In the drawings, to facilitate understanding, important portions are expanded and illustrated, and therefore are different in actual scales.

First Embodiment

In a first embodiment, an optical vortex modulator generated using silicon photonics appropriate for integration will be described. The optical vortex modulator expresses a state ("0" and "1" of digital information), for example, by causing a quantized vortex of a coherent laser beam to be sinistral or dextrorse, and realizes any superposition state of a left vortex state (|L>) and a right vortex state (|R>). The optical vortex modulator includes a plurality of components (optical elements). First, structures of the components will be described.

Figure 2A:
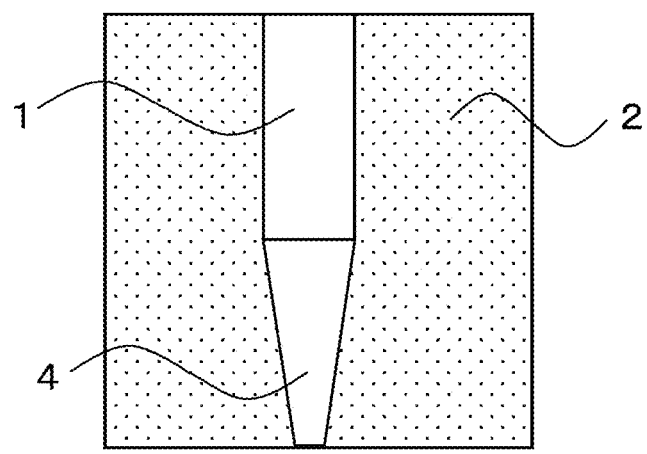
FIG. 2A is a plan view of a spot-size converter.
Figure 2B:
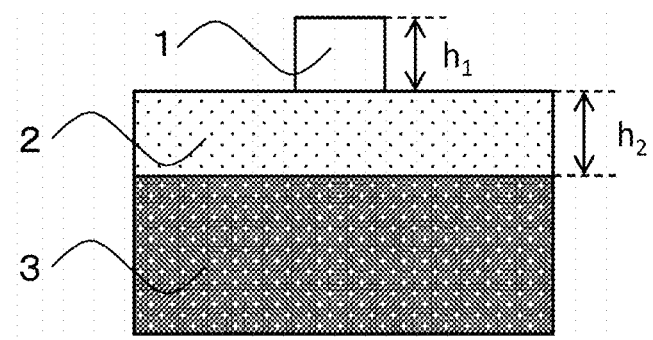
FIG. 2B is a sectional view of a silicon thin line waveguide.

FIG. 2A illustrates a spot-size converter (a plan view) formed at an end surface of a silicon ship. The spot-size converter has a structure in which a tapered silicon thin line waveguide 4 is coupled with a silicon thin line waveguide 1. As illustrated in FIG. 2B (a sectional view), the silicon thin line waveguide 1 is formed on a silicon dioxide 2 which is an embedded oxide film. The silicon dioxide 2 is formed on a silicon support substrate 3. Such a substrate is called as a silicon-on-insulator (SOI) substrate. For example, a thickness $h^1$ of a single crystal silicon layer in which the silicon thin line waveguide 1 is formed is 220 nm and a film thickness $h_2$ of the silicon dioxide 2 of the SOI substrate is 2 µm.

Figure 3:
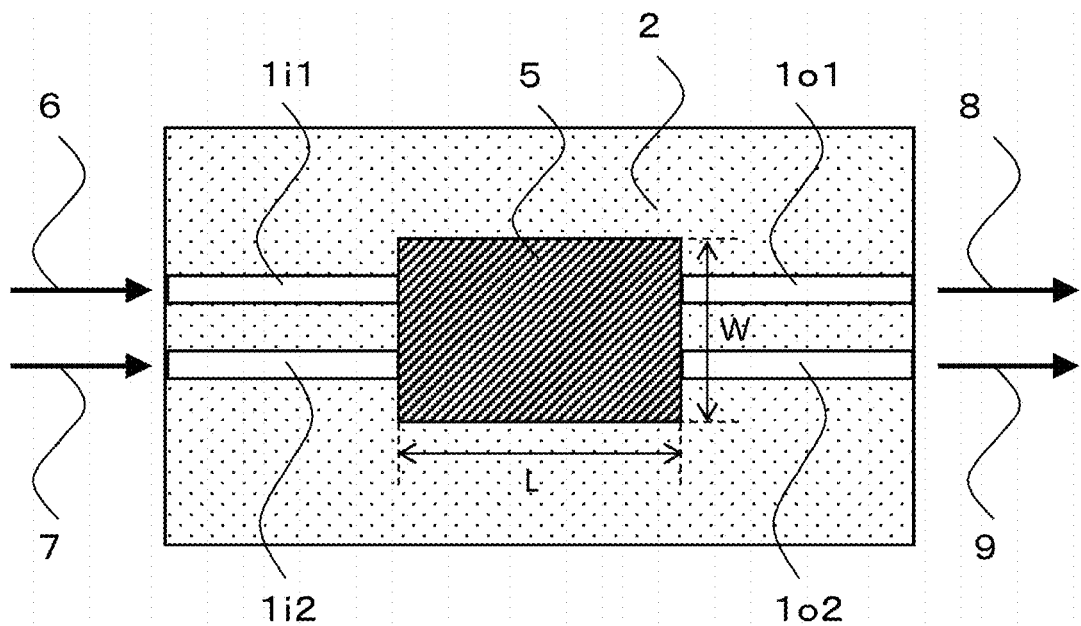
FIG. 3 is a plan view of a multi-mode interference optical waveguide.

FIG. 3 illustrates a multi-mode interference optical waveguide 5 (a plan view). The silicon thin line waveguide 1 is connected to a multi-mode interference (MMI) optical waveguide 5 to form two input ports 1$i$1 and 1$i$2 (first and second input ports) and two output ports 1$o$1 and 1$o$2 (first and second output ports). A laser beam 6 is incident on the first input port 1$i$1 and a laser beam 7 is incident on the second input port 1$i$2. In the MMI optical waveguide, the laser beam may not necessarily be incident on both the input ports. Although the laser beam is incident on only one input port, there is no problem. The laser beams incident on the MMI optical waveguide 5 are combined, and subsequently are separated to be emitted from the two output ports. A laser beam 8 is emitted from the first output port 1$o$1 and a laser beam 9 is emitted from the second output port 1$o$2. The MMI optical waveguide 5 can be designed so that the light input from the first input port 1$i$1 is equally divided into the output ports 1$o$1 and 1$o$2 when no light is input from the second input port 1i2. In this case, intensity of the light of the laser beams 8 and 9, that is, the number of photons flowing per a unit time is equal.

Here, to obtain desired characteristics, it is necessary to be careful about design of the MMI optical waveguide 5. W is a width of the MMI optical waveguide, L is a length of the MMI optical waveguide, λ is a wavelength of a laser beam in vacuo, and n is an effective refractive index of the silicon thin line waveguide 1. Although not illustrated in FIG. 2B, as will be described below, a clad layer is formed on the silicon thin line waveguide 1 and the laser beam propagates using the silicon thin line waveguide 1 as a core layer. The effective refractive index is a refractive index of the silicon thin line waveguide 1 (the core layer) in which presence of the clad layer is taken into consideration.

The wavelength λ of the laser beam is 1550 nm of a communication wavelength band. The effective refractive index n also depends on the width of the silicon thin line waveguide 1, but is a value of about 3. At this time, a bit length for causing a phase difference n which occurs at the time of propagation in the MMI optical waveguide 5 is described in Equation (5).

$$L_\pi = \frac{4nW^2}{3\lambda} \quad (5)$$

An optimum value of the length L of the MMI optical waveguide 5 depends on the width W and a positional relation between the input and output ports. When a distance between a central position of the first input port 1i1 and a central position of the second input port 1i2 and a distance between a central position of the first output port 1o1 and a central position of the second output port 1o2 satisfy W/3, optimum distribution is achieved at the time of $L=L_\pi/2$. When the input and output ports are located at other positions, optimum distribution is achieved at the time of $L=3L_\pi/2$. When the length L is set to $L_\pi/2$, the MMI optical waveguide 5 can be shortened, and thus performance such as a distribution ratio deteriorates. Therefore, a design example in the case of the length $L=3L_\pi/2$ will be described below. To improve coupling efficiency of the MMI optical waveguide 5 and the silicon thin line waveguide 1 which is the input and output ports, a portion coupled with the silicon thin line waveguide 1 may be formed in a tapered shape and may be connected to the MMI optical waveguide 5 by expanding a line width.

Figure 4A:
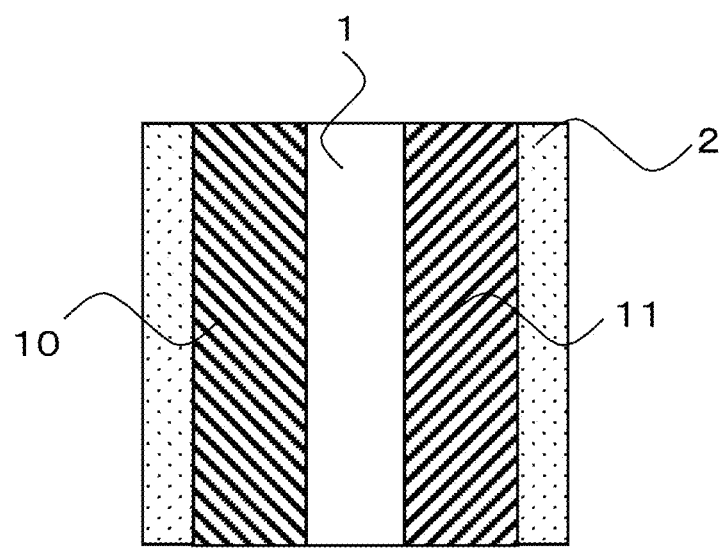
FIG. 4A is a plan view of a phase modulator.
Figure 4B:
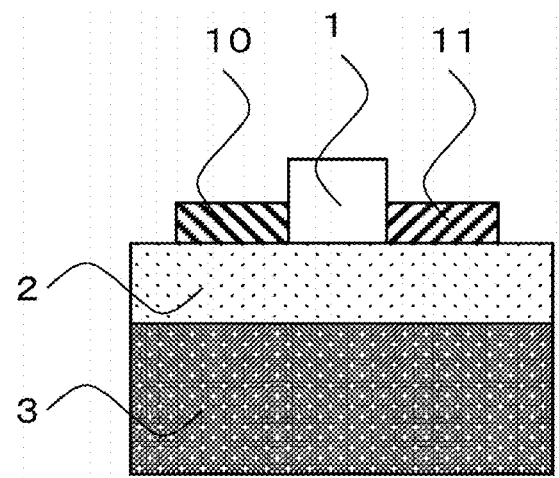
FIG. 4B is a sectional view of the phase modulator.

Next, FIGS. 4A and 4B are respectively a plan view and a sectional view of the phase modulator. The phase modulator has a Rib structure in which a p-type doped silicon 10 and an n-type doped silicon 11 are connected to both sides of the silicon thin line waveguide 1. These doped silicons are connected to electrodes (not illustrated), and thus a carrier density of a middle portion in the silicon thin line waveguide 1 is adjusted by applying a voltage to a PIN junction. Thus, a refractive index of the silicon thin line waveguide 1 is changed to modulate a phase of a laser beam propagating through the waveguide.

Here, the example of the phase modulator in which the PIN junction is used has been described. However, a PN junction may be used or a metal-oxide-semiconductor (MOS) structure or the like in which an insulating film is interposed may be used. The material may not be limited to silicon, and an electro-absorption (EA) modulator using a compound semiconductor or an EO modulator using $NiNbO_3$ may be used. Alternatively, the structure of a known phase modulator disclosed in S. Saito et al. "Si photonic waveguides with broken symmetries: applications from modulators to quantum simulations" Japanese Journal of Applied Physics, 59, 500801 (2020), may be adopted. It is preferable to improve the coupling efficiency by processing a connection portion of a Rib waveguide (a phase modulator) and the silicon thin line waveguide 1 in a tapered shape.

Figure 5:
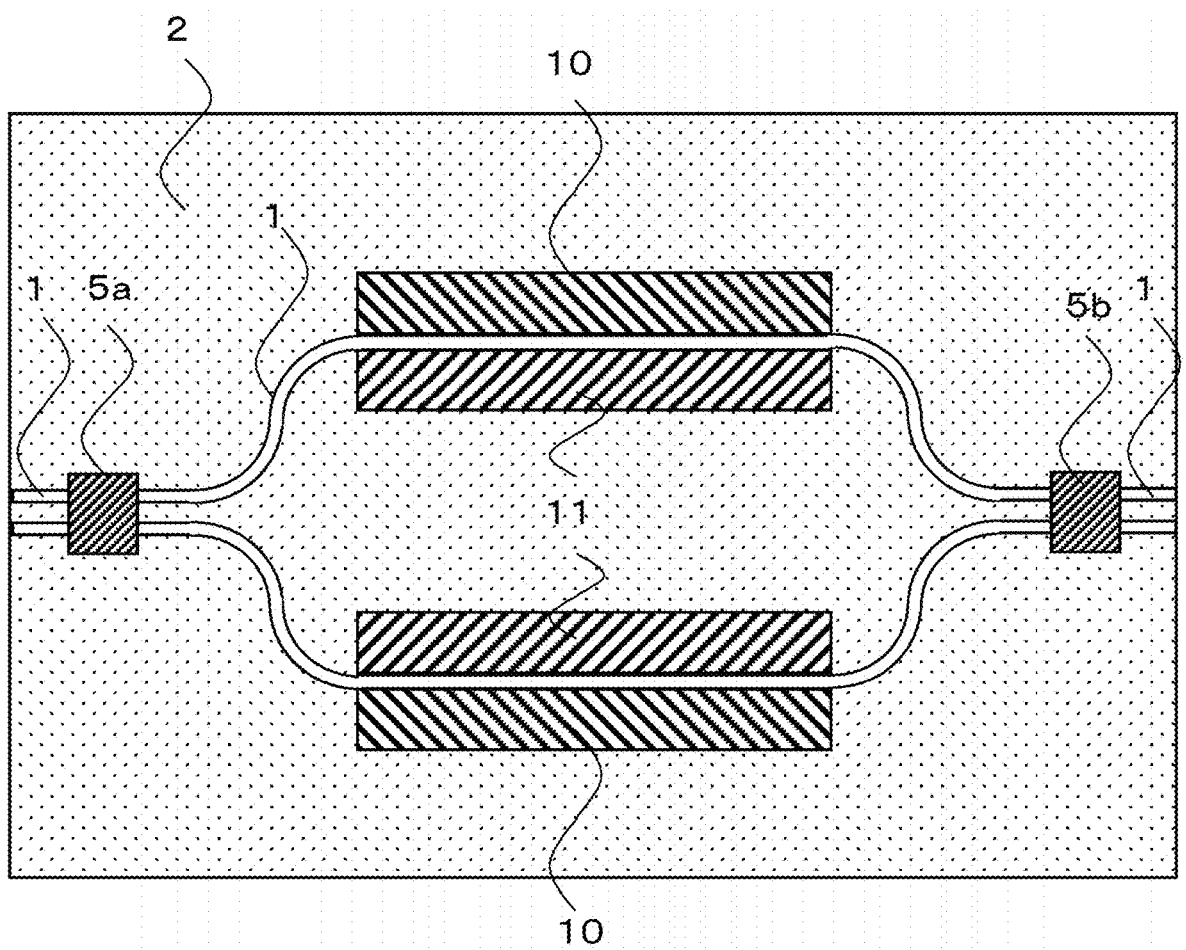
FIG. 5 is a plan view of a Mach Zehnder modulator.

FIG. 5 illustrates an MZ optical modulator in which such a phase modulator is integrated in an MZ interferometer. A laser beam incident on one of the input ports formed in the silicon thin line waveguide 1 is divided into two beams by a MMI optical waveguide 5a. A desired voltage is applied to each of the p-type doped silicon 10 and the n-type doped silicon 11 of the two phase modulators. Thus, by generating a phase difference between a laser beam propagating through an upper arm and a laser beam propagating through a lower arm and then combining the laser beams with an MMI optical waveguide 5b, it is possible obtain a desired interference effect.

Figure 6A:
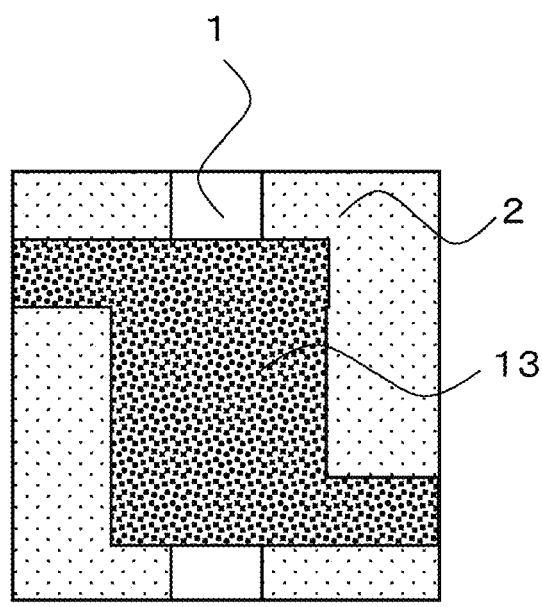
FIG. 6A is a plan view of a temperature adjustment type phase shifter.
Figure 6B:
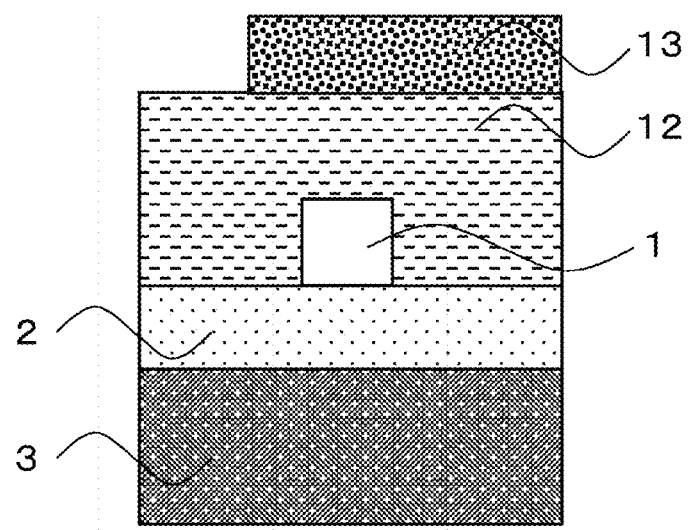
FIG. 6B is a sectional view of the temperature adjustment type phase shifter.

Here, the refractive index is changed with a change in a temperature of the silicon thin line waveguide 1. Therefore, the phase of light is also changed with a change in a temperature of a silicon chip due to an influence of an external environment or the like. To minutely adjust the phase of the light, a temperature adjustment type phase shifter may be used. FIGS. 6A and 6B are respectively a plan view and a sectional view of the temperature adjustment type phase shifter. An upper clad silicon dioxide 12 (not illustrated in FIG. 6A) illustrated in FIG. 6B is formed throughout the upper portion of the MZ modulator actually illustrated in FIG. 5. A tungsten resistor 13 is formed on the upper portion of the upper clad silicon dioxide 12 and the silicon thin line waveguide 1. Joule's heat is generated by injecting a current to the tungsten resistor 13 and the phase can be adjusted by transferring the temperature to the silicon thin line waveguide 1. Here, it is necessary to cause the upper clad silicon dioxide 12 to be sufficiently thick so that seeping light of the laser beam is not coupled with electrons in the tungsten resistor 13. The thickness of the upper clad silicon dioxide 12 may be set to about 2 μm.

Figure 7A:
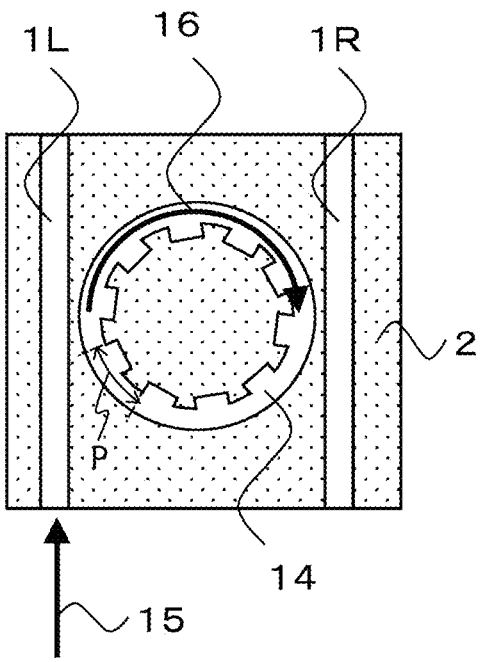
FIG. 7A is a plan view of a grating-coupled ring waveguide gear.
Figure 7B:
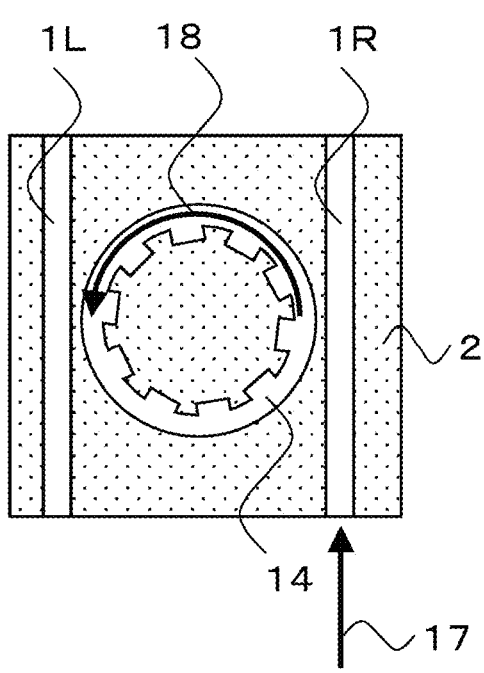
FIG. 7B is a plan view of the grating-coupled ring waveguide gear.
Figure 7C:
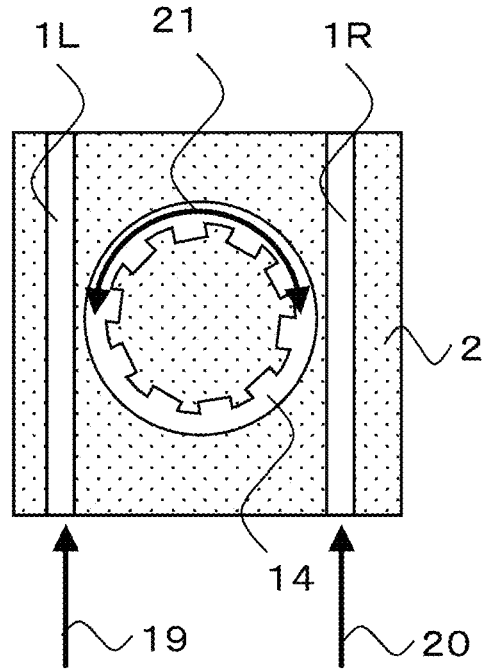
FIG. 7C is a plan view of the grating-coupled ring waveguide gear.

FIGS. 7A to 7C illustrate a grating-coupled ring waveguide gear 14 generating a coherent laser beam in a superposition state. The grating-coupled ring waveguide gear is formed simultaneously with the silicon thin line waveguide 1 by processing a single crystal silicon layer formed on the SOI substrate. The grating-coupled ring waveguide gear 14 is a ring waveguide that has a periodic structure functioning as a grating in its inner circumference. A period P of the periodic structure is set to a magnitude which is an integral multiple of a wavelength λg in a medium of a laser beam.

A state of FIG. 7A will be described. An input laser beam 15 from a left waveguide (a silicon thin line waveguide) 1L propagates toward the ring waveguide gear 14, and thus the laser beam transitions from the left waveguide 1L to the ring waveguide gear 14 and turns to a laser beam 16 propagating clockwise through the ring waveguide 14. This propagation can be realized by controlling a size of a gap located between the ring waveguide gear 14 and the silicon thin line waveguide 1 with high precision. For example, the size of the gap is set to 100 nm. The laser beam 16 is rotated inside the ring waveguide gear 14 to obtain an orbital angular momentum. The laser beam 16 is raised in the vertical direction with respect to a main surface of the SOI substrate by the grating formed in the ring waveguide gear 14. By causing the grating to give a momentum in a direction opposite to the rotation direction of the laser beam 16, the laser beam 16 is not rotated in the ring waveguide gear 14 to be released upward. At this time, when the momentum of the laser beam becomes completely zero, the laser beam is not rotated and the orbital angular momentum also becomes zero. Accordingly, the shape of the grating is designed so that the momentum of the laser beam gives a momentum in an opposite direction, that is, the counterclockwise rotation. Thus, the laser beam with the orbital angular momentum is emitted in the vertical direction from the main surface of the SOI substrate. In this way, when the laser beam 15 is incident on the left waveguide (the silicon thin line waveguide) 1L, a laser beam in a left vortex state is generated.

FIG. 7B illustrates a state of the opposite direction to FIG. 7A. When an input laser beam 17 is incident from a right waveguide 1R, a laser beam 18 propagating counterclockwise in the ring waveguide gear 14 is generated. The laser beam 18 obtains a momentum in the opposite direction from the grating of the same ring waveguide gear 14, and thus the laser beam in the right vortex state is emitted in the vertical direction from the main surface of the SOI substrate.

FIG. 7C illustrates a state in which laser beams 19 and 20 are respectively incident on both the left waveguide 1L and the right waveguide 1R. The laser beam 19 input from the left waveguide 1L propagates in the ring waveguide gear 14, and thus there is the laser beam propagating clockwise. The laser beam 20 input from the right waveguide 1R propagates in the ring waveguide gear 14, and thus there is the laser beam propagating counterclockwise. Then, a laser beam 21 in the superposition state is generated. Due to the laser beam 21, a laser beam that has a superposition state of quantum mechanics of the left vortex state and the right vortex state is emitted vertically from the main surface of the SOI substrate.

Figure 8:
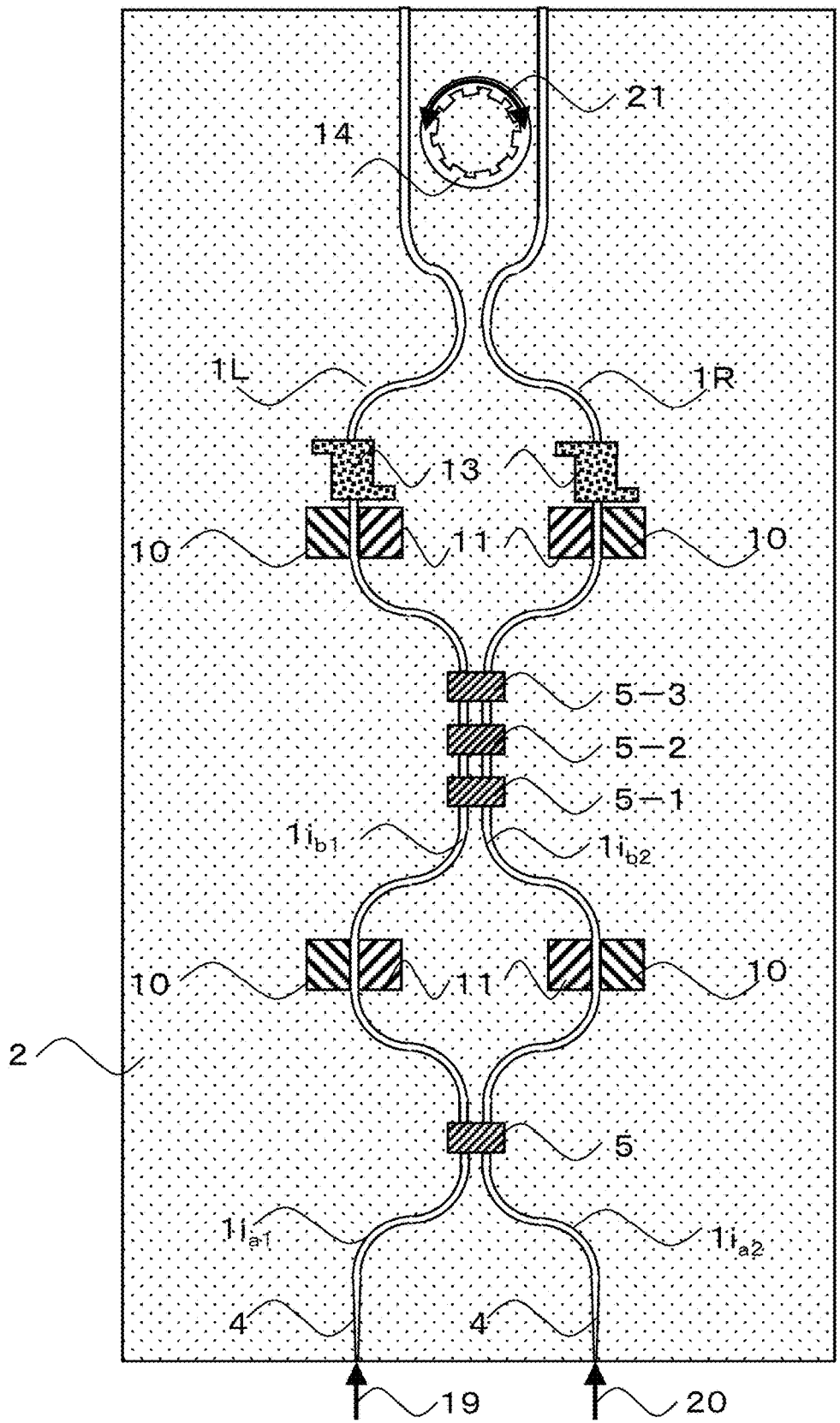
FIG. 8 is a plan view of an optical vortex modulator.

An optical vortex modulator in which the above components are integrated on the SOI substrate is illustrated in FIG. 8. The laser beam 19 input from the left waveguide of the optical vortex modulator and the laser beam 20 input from the right waveguide of the optical vortex modulator are coupled highly efficiently from the end surface of the SOI substrate (chip) to the tapered silicon thin line waveguide 4 which is a spot-size converter. The incident laser beams are coupled in the silicon thin line waveguide 1 and are once combined in the MMI optical waveguide 5, and subsequently separated again.

For the purpose of realizing the superposition state of the right vortex state and the left vortex state expressed in Equation (4) in which a phase is determined from single-mode light from a laser light source (not illustrated), only the laser beam 19 is input and the laser beam 20 is not input. In this case, it is preferable to design the silicon thin line waveguide 1 in a single-mode condition and set a condition in which the laser beam propagates in only a TE mode. To satisfy this condition, the width of the silicon thin line waveguide 1 is set to 450 nm, but this width can be adjusted. To maximize the coupling efficiency of the laser beams, it is preferable to adjust and couple the laser beams with the silicon thin line waveguide 1 with the polarization mode output from the laser beams maintained. Therefore, a polarization maintenance fiber may be used or a polarization adjuster may be used. Hereinafter, an aspect in which only the laser beam 19 is incident on the optical vortex modulator and a laser beam in a superposition state of the left vortex state and the right vortex state is generated will be described.

Light incident on the silicon thin line waveguide 1 from the laser light source is incident from an input port $1i_{a1}$ to the MMI optical waveguide 5. FIG. 3 illustrates a state in which the laser beam 6 is incident and the laser beam 7 is not incident. As described with reference to FIG. 3, the MMI optical waveguide 5 has the MMI optical waveguide design satisfying $L=3L_\pi/2$ and an output is divided at intensity of 50%:50% between the laser beams 8 and 9.

Referring back to FIG. 8, the description will be continued. The phases of the pieces of light divided in the MMI optical waveguide 5 are adjusted by other phase modulators. This can be realized by applying a desired voltage to each of the p-type doped silicon 10 or the n-type doped silicon 11 of the phase modulators. When $\theta_1$ is a phase given to the laser beam passing the left arm and $\theta_2$ is a phase given to the laser beam passing the right arm, a phase difference $(\theta_2-\theta_1)$ between the phases is expressed as a phase difference $\theta$.

Here, an example in which both a phase modulator controlling the phase of the laser beam passing the left arm and a phase modulator controlling the phase of the laser beam passing the right arm are included will be described. However, a phase difference may be made between two laser beams. Thus, there is no problem even in a configuration in which only the phase of the laser beam passing one of the arms is modulated. By using two phase modulators, there is an advantage of decreasing the magnitude of a voltage necessary, for example, to perform an operation differentially to about half. The same applies to the following embodiments.

As illustrated in FIG. 8, the laser beams passing the phase modulators of the right and left arms are respectively incident on input ports $1i_{b1}$ and $1i_{b2}$ of the MMI optical waveguide 5. This corresponds to an operation as the MZ optical modulator described in FIG. 5. A transfer matrix method is used to calculate amplitudes of the laser beams output from two outputs of the MZ optical modulator. Accordingly, as illustrated in FIG. 5, characteristics of an MZ optical modulator in a case in which one MMI optical waveguide 5 is provided on the input side and one MMI optical waveguide 5 is provided on the output side can be expressed by a matrix in Equation (6).

$$\begin{pmatrix} \sin(\theta/2) & \cos(\theta/2) \\ \cos(\theta/2) & -\sin(\theta/2) \end{pmatrix} \quad (6)$$

This indicates that the MZ optical modulator can be used as a power splitter. As described above, when only the laser beam 19 is input to the optical vortex modulator, input column vectors are obtained as in Equation (7). Therefore, the input column vectors expressed in Equation (7) are applied to Equation (6), and thus it can be known that the output laser beam becomes Equation (8).

$$\begin{pmatrix} 1 \\ 0 \end{pmatrix} \quad (7)$$

$$\begin{pmatrix} \sin\left(\frac{\theta}{2}\right) \\ \cos\left(\frac{\theta}{2}\right) \end{pmatrix} \quad (8)$$

Since the intensity of the output laser beam may be calculated as a square of an absolute value of its amplitude, the laser beam is reliably divided into $\sin^2(\theta/2)$ and $\cos^2(\theta/2)$. Here, the laser output power is normalized to 1, but it is needless to say that the laser output power can be realized as any power intensity. This is similar even when the intensity of light handled as the laser beam is about one photon. In an actual circuit, there is a loss of light. Therefore, despite slight deviation from the theoretical values $\sin^2(\theta/2)$ and $\cos^2(\theta/2)$, there is no problem when a relative intensity ratio is controlled to a desired value.

In this way, the optical vortex modulator according to the embodiment divides the optical intensity by using the MZ optical modulator in which the MMI optical waveguide 5 is used as a power splitter.

However, when Equation (8) is compared with Equation (4), the optical intensity is similarly divided, but there is a difference in sin and cos.

On the other hand, when the laser beam 20 is incident from the right input port $1i_{a2}$ of FIG. 8 as an input port of the MZ optical modulator and the laser beam 19 is not incident, a different result can be obtained. In this case, the input column vectors are obtained as in Equation (9) and the output column vectors are obtained as in Equation (10), and sin and cos coincide Equation (4), but the signs of sin and cos are different.

$$\begin{pmatrix} 0 \\ 1 \end{pmatrix} \quad (9)$$

$$\begin{pmatrix} \cos\left(\frac{\theta}{2}\right) \\ -\sin\left(\frac{\theta}{2}\right) \end{pmatrix} \quad (10)$$

In this way, in the matrix of Equation (6), there is no complete coincidence with amplitude of Equation (4). Therefore, to use an input to the optical vortex modulator as any laser and use the MZ optical modulator as any rotator, it is not preferable to use the matrix of Equation (6). Equation (6) is analogous to a rotating matrix, but is not the rotating matrix itself. Therefore, this is called a pseudo-rotating operator.

In the embodiment, as illustrated in FIG. 8, the laser beam output from the phase modulator successively passes through three MMI optical waveguides 5-1 to 5-3 so that any rotator can be used. It was checked that the output characteristics are obtained as in Equation (11) by adopting such a device structure.

$$\begin{pmatrix} \cos(\theta/2) & -\sin(\theta/2) \\ \sin(\theta/2) & \cos(\theta/2) \end{pmatrix} \quad (11)$$

In this case, only the laser beam 19 is input to the optical vortex modulator, the input column vectors are obtained as in Equation (7), the output column vectors are obtained as in Equation (12), and the amplitude and the signs coincide with those of Equation (4).

$$\begin{pmatrix} \cos\left(\frac{\theta}{2}\right) \\ \sin\left(\frac{\theta}{2}\right) \end{pmatrix} \quad (12)$$

Here, the reason why an angle is $\theta/2$ is that the amplitude of the laser beam is a wave function. When an expected value of an orbital angular momentum or the spin angular momentum is calculated using the wave function, it can be proved that the MZ optical modulator expressed in Equation (11) rotates an optical angular momentum state indicated by vectors in a Poincare sphere illustrated in FIG. 1 around the Z axis by $\theta$. Accordingly, by using the MZ optical modulator in which the plurality of MMI optical waveguides 5 according to the embodiment are used, it is possible to actually prove that a correct rotator can be configured.

Here, the design of the MMI optical waveguides 5 will be supplemented. In the exemplary configuration of FIG. 8, three MMI optical waveguides 5 satisfying $L=3L_\pi/2$ are designed to be connected in series using the general design condition of the MMI optical waveguides 5. Instead of this, an MMI optical waveguide configured to triple the length of the MMI optical waveguide on the output side, that is, to satisfy $L=9L_\pi/2$, may be used. In this case, the number of MMI optical waveguides on the output side can be set to 1. Actually, since there is a limit on approximation of an effective refractive index, the optimum value slightly deviates from simply three times the length. However, according to a known simulation technology using a finite element method, it is possible to easily obtain the optimum value of the length L of the MMI optical waveguide on the output side.

When the device size is desired to be small, as described above, the centers of the connection positions of the silicon thin line waveguides 1 to the MMI optical waveguides 5 are disposed at positions symmetric by W/3 with respect to the width W of the MMI optical waveguide 5 so that $L=L_\pi/2$ can be satisfied. In this case, one MMI optical waveguide satisfying $L=3L_\pi/2$ can be used as the MMI optical waveguide on the output side.

Further, instead of the MMI optical waveguide 5, the waveguides may be coupled using a directional coupler, a ring resonance, or the like in which waveguides are coupled.

Referring back to FIG. 8, the description will be continued. The MZ optical modulator separates the laser beam into two laser beams with desired optical intensity. Subsequently, a phase difference is made between the laser beams. Therefore, different phases may be given to the laser beams by a new phase modulator. Therefore, the phase modulator illustrated in FIGS. 4A and 4B may be provided and a desired voltage is given to each of the p-type doped silicon 10 and the n-type doped silicon 11 for the realization. For example, a phase $\phi_1$ is given to the laser beam incident on the left arm and a phase $\phi_2$ is given to the laser beam incident on the right arm. Here, when a phase difference between both the phases is set to $\phi=\phi_2-\phi_1$, it is appropriate to give a phase $-\phi/2$ to the laser beam incident on the left waveguide 1L and give a phase $\phi/2$ to the laser beam incident on the right waveguide 1R. Accordingly, it can be checked that the amplitude of the laser beam obtained by modulating the phase after the laser beam passes through the MZ optical modulator enters the state in Equation (4). The phase modulator can be operated with only one arm. However, disposing the phase modulators on both the waveguides and differentially operating the phase modulators, the phase modulators can be operated at an operation voltage which is a half compared to the case of only one side. The same applies to the following embodiments.

As described above, characteristics of the light phase modulator are changed depending on temperature. To reduce an influence of the outside environment, in the exemplary configuration of FIG. 8, the temperature adjustment type phase shifters (the tungsten resistors 13) illustrated in FIGS. 6A and 6B are integrated. By heating a heater with desired consumption power using a feedback circuit (not illustrated) from a temperature controller, it is possible to minutely adjust the phase.

With the foregoing configuration, a desired complex amplitude was successfully given to the laser beam propagating through the left waveguide 1L and the laser beam propagating through the right waveguide 1R. The laser beam in any superposition state of the left vortex state and the right vortex state is generated by coupling the grating-coupled ring waveguide gear 14 with the left waveguide 1L and the right waveguide 1R. As described with reference to FIGS. 7A to 7C, by generating the laser beam 21 in the superposition state of the counterclockwise rotation and the clockwise rotation in the ring waveguide 14, it is possible to generate the laser beam which is emitted in the vertical direction to the main surface of the SOI substrate and is in any superposition state of the right vortex state and the left vortex state.

Figure 16:
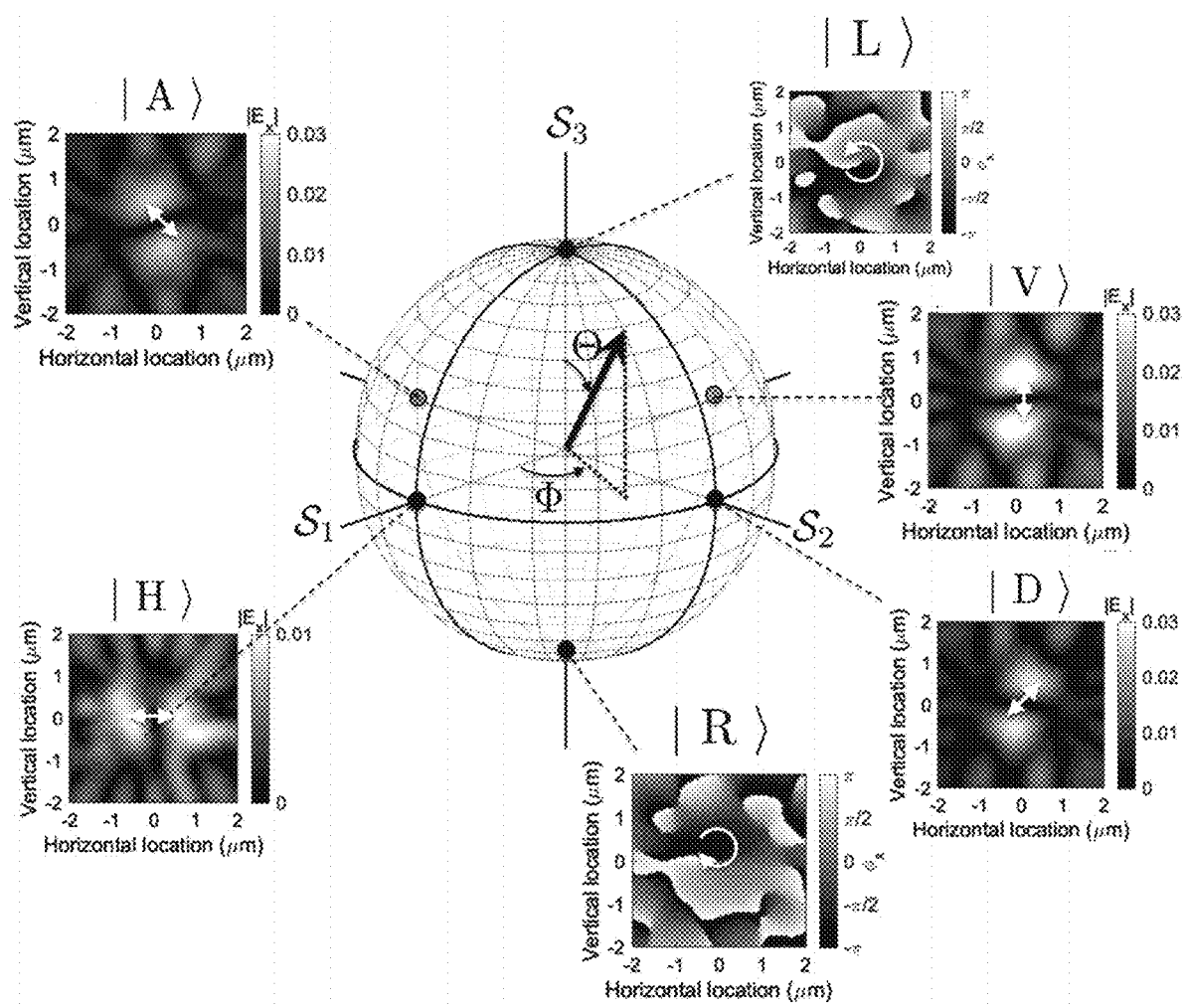
FIG. 16 is a diagram illustrating a simulation for changing an orbital angular momentum of light by an optical vortex modulator.

FIG. 16 illustrates an aspect in which a change in the orbital angular momentum of light in the optical vortex modulator is simulated. It can be understood that states of the north pole and the south pole in an expanded Poincare sphere have angular momenta of a left vortex state ($|L>$) and a right vortex state ($|R>$). Thus, it can be understood that states located on the equator of the expanded Poincare sphere (a horizontally polarized state ($|H>$), a vertically polarized state ($|V>$), a diagonal state ($|D>$), and an antidiagonal state ($|A>$)) have linearly vibrating angular momenta. In any orbital angular momentum state, amplitude decreases near the center. This is a phenomenon common to all vortex structures such as tropical storms or turbulences and indicates that an optical vortex can be generated.

Next, an overview of a method of generating the optical vortex modulator illustrated in FIG. 8 will be described. A condition of a process, a material, and the like can be appropriately changed. First, an SOI substrate is prepared. Instead of the SOI substrate, a substrate of a semiconductor or an insulator such as a silicon substrate or a sapphire substrate attached to a glass substrate may be used. Subsequently, a photolithography apparatus or an electron-beam lithography apparatus, and a dry etching apparatus are used to etch silicon of regions serving as the p-type doped silicon 10 and the n-type doped silicon 11 so that the thickness becomes 110 nm. Through a cleaning process, the photolithography apparatus and the dry etching apparatus are used again to process the silicon thin line waveguide 1. In such photolithography, an immersion ArF apparatus can be utilized. In this processing, the tapered silicon thin line waveguide 4, the MMI optical waveguide 5, and the grating-coupled ring waveguide gear 14 are simultaneously processed.

Subsequently, through the cleaning process, phosphorus (P) which is an n-type impurity is subjected to ion-injection using a resist processed in the photolithography as a mask. Thereafter, boron (B) which is a p-type impurity is subjected to ion-injection using a resist processed in the photolithography as a mask. Instead of P, arsenic (As) may be injected. Subsequently, after cleaning, the upper clad silicon dioxide 12 is deposited by chemical vapor deposition. Thereafter, thermal processing is performed for 2 minutes at 950° C. to activate the impurities in rapid thermal annealing (RTA). Subsequently, the surface is flattened by chemical mechanical polishing, and then is cleaned.

Subsequently, after desired contact holes are opened by the photolithography apparatus and the dry etching apparatus, nickel (Ni) is deposited on the entire surface by sputtering and thermal processing is performed at 550° C., and thus silicon surfaces of openings are formed as silicide to form NiSi. This is effective to reduce contact resistance through low resistance processing. By removing unreactive Ni using a chemical liquid and then causing tungsten (W) to grow by chemical vapor deposition to form W plugs. Further, the tungsten resistor 13 is formed using the photolithography apparatus and the dry etching apparatus.

Subsequently, silicon dioxide is deposited by chemical vapor deposition, is subsequently flattened again by chemical mechanical polishing, and is cleaned. Contact holes are opened using the photolithography apparatus and the dry etching apparatus, a cleaning process is subsequently performed, titanium nitride (TiN) is deposited by sputtering, aluminum (Al) is subsequently deposited by sputtering, and electrodes are processed using the photolithography apparatus and the dry etching apparatus. Instead of Al, metal such as cupper (Cu) may be used. An upper wiring layer may be formed to integrate a more complicated optical circuit or consolidate an electronic device. After wire processing ends, annealing is performed in a hydrogen atmosphere of 400° C. and defects on a silicon interface or the like are terminated with hydrogen to complete a device (an optical vortex modulator).

Thereafter, a chip is extracted from a large-diameter silicon substrate. At this time, stealth dicing is performed to process the tapered silicon thin line waveguide 4 without being damaged. Instead of the stealth dicing, laser dicing may be used. By using such a dicing method, it is possible to process the end surface of the chip flatly. Instead of using such a special dicing apparatus, dicing may be performed with a normal blade, and subsequently the surface may be polished or a good interface with small damage may be formed by cleaving of the silicon substrate. An anti-reflective film may be vapor-deposited on the end surface of the chip. Thus, the coupling efficiency can be improved. Then, it is possible to obtain the chip on which the optical vortex modulator is mounted.

When the optical vortex modulator is used as a communication device, the MZ optical modulator can be driven at, for example, 25 Gbps, and thus intensity of a photon vortex can be modulated at a high speed. Since the right vortex state is orthogonal to the left vortex state, the orthogonal state can be further distinguished by a phase modulator on the rear stage of the MZ optical modulator to distinguish four states. Accordingly, large-capacity communication of 100 Gbps per wavelength can be performed. When an electrode of the phase modulator is used as a traveling waveguide for high-speed modulation, terminating resistance of 50Ω is generally added to prevent reflection. To reduce power consumption caused due to the addition of the terminating resistance, a MOS phase modulator may be used instead of the PIN phase modulator exemplified in the embodiment. The length of the modulator can be shortened by using the MOS phase modulator. Therefore, the terminating resistance can be eliminated by sufficiently performing an operation with a lumped constant circuit, and thus a low-power consumption operation is possible.

Second Embodiment

In a second embodiment, a polarization modulator capable of controlling a polarized state (a spin angular momentum state) of a laser beam incident on a chip in the vertical direction to any polarized state at a high speed without a special dicing process by introducing a 2-dimensional grating coupler will be described. The polarization modulator according to the second embodiment is a device capable of rotating vectors of a Poincare sphere indicating the polarized states, as illustrated in FIG. 1, in any direction, and therefor is named a Poincare rotator.

Figure 9:
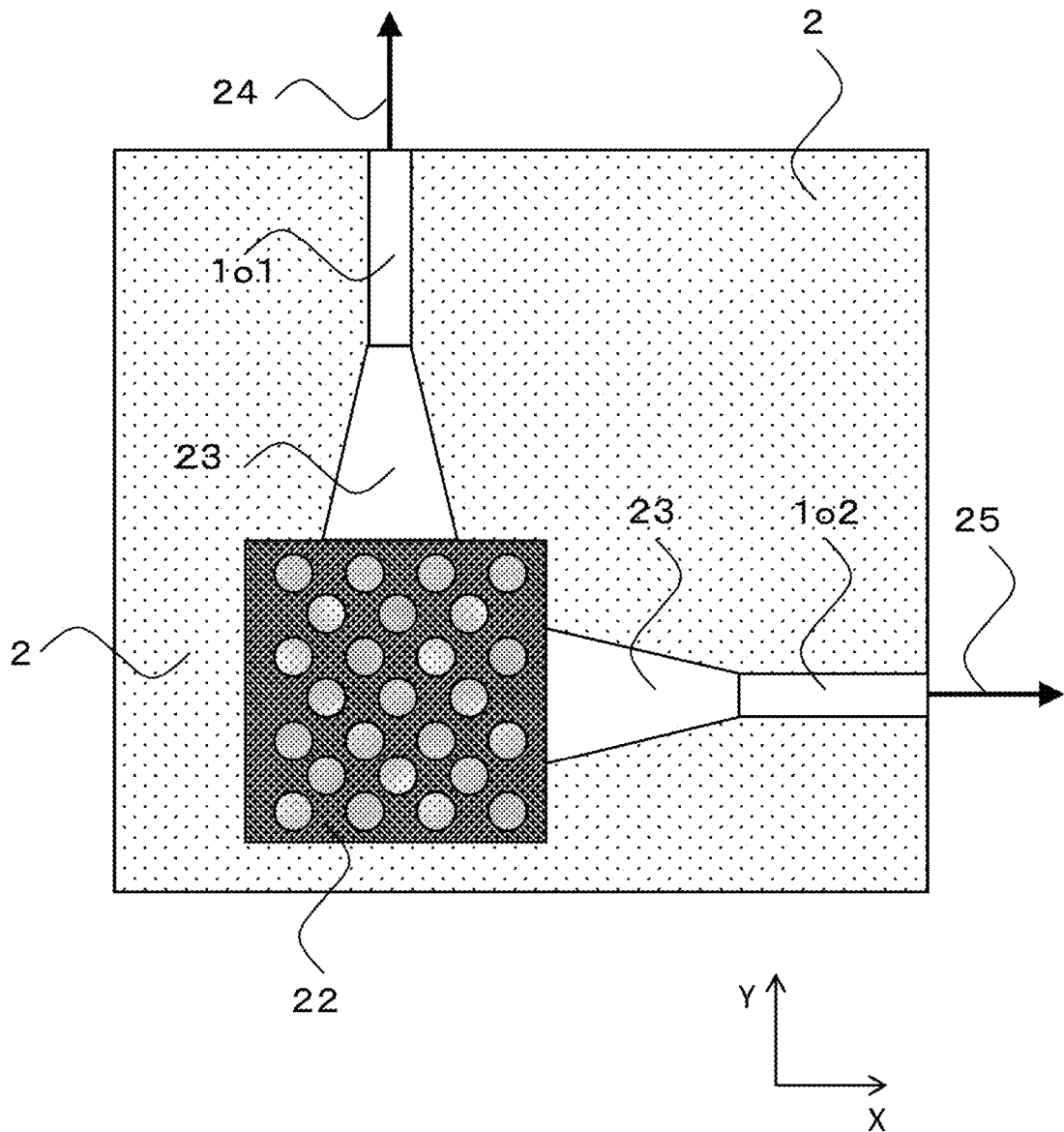
FIG. 9 is a plan view of a 2-dimensional grating coupler.

FIG. 9 illustrates a plan view of a 2-dimensional grating coupler 22. The 2-dimensional grating coupler 22 is formed by processing a single crystal silicon layer on the silicon dioxide 2. An example in which the polarization modulator according to the embodiment is also generated using a silicon photonics appropriate for integration will be described. A design example in a case in which the same SOI substrate as that of the first embodiment is used to generate the polarization modulator will be exemplified. The 2-dimensional grating coupler 22 is formed in a single crystal silicon layer with a thickness of 220 nm and many holes in a middle portion are etched until a depth of 110 nm is formed by dry etching. The many holes are arranged 2-dimensionally periodically, and thus are called photonic crystal. Since the photonic crystal gives a momentum to light because of its periodicity, the photonic crystal operates as a grating for changing a traveling direction of the light.

For example, by setting a pitch interval between the holes of the photonic crystal to 580 nm, it is possible to change an optical path of a laser beam incident vertically from an optical fiber disposed vertically to the main surface of the SOI substrate on the 2-dimensional grating coupler 22 in the horizontal direction (a direction parallel to the main surface of the SOI substrate). The 2-dimensional grating coupler 22 has, for example, a rectangular planar shape and two output ports are provided on its side surfaces. The first output port $1o1$ extends in the Y direction and is connected to a first side surface of the 2-dimensional grating coupler 22. The second output port $1o2$ extends in the X direction and is connected to a second side surface adjacent to the first side surface of the 2-dimensional grating coupler 22. The X and Y directions form a plane parallel to the main surface of the SOI substrate and are defined as mutually vertical directions.

To improve coupling efficiency of the grating coupler 22 and the silicon thin line waveguide 1 forming the output ports, the tapered silicon thin line waveguide 23 is formed and the mode shape of light is made smaller gradually adiabatically, so that coupling from the grating coupler 22 to the silicon thin line waveguide 1 can be realized high efficiently. By causing a laser beam 24 emitted from the first output port $1o1$ to propagate in the Y direction and performing design to satisfy a single mode condition in which the silicon thin line waveguide 1 enters the TE mode, a mode in which a polarization direction of the laser beam 24 to be emitted is vibrated in the X direction is realized.

On the other hand, by causing a laser beam 25 emitted from the second output port $1o2$ to propagate in the X direction and performing design to satisfy a single mode condition in which the silicon thin line waveguide 1 enters the TE mode, a mode in which a polarization direction of the laser beam 25 to be emitted is vibrated in the Y direction is realized.

In this way, the 2-dimensional grating coupler 22 has not only a function of changing the propagation direction of the laser beam incident from the vertical direction but also a function of separating the polarization mode highly efficiently. A Poincare rotator according to the second embodiment realizes any polarized state by separating a different polarized state (a spin angular momentum state) orthogonal completely in the quantum mechanics and subsequently modulating a ratio between the amplitude and the phase at a high speed.

In the foregoing description, the example in which the laser beam is incident on the 2-dimensional grating coupler 22 in a direction vertical to the SOI substrate has been described. Although disposition of an optical fiber is simple in this case, there is a problem that return light reflected from the chip is coupled with the optical fiber again. There is concern of the return light damaging a semiconductor laser which is a light source. Therefore, when the optical fiber is disposed vertically to the chip in this way, it is necessary to protect the light source at an optical isolator.

To shield the return light, the laser beam may be incident at an angle with respect to the chip. For example, when the return light is incident at an angle of 3° in a direction vertical to the SOI substrate, most of the return light can be eliminated. In this case, an optimum wavelength of the laser beam deviates from 1550 nm to 1530 nm, but either wavelength is a wavelength widely used as a communication wavelength and a special problem does not occur.

Figure 10:
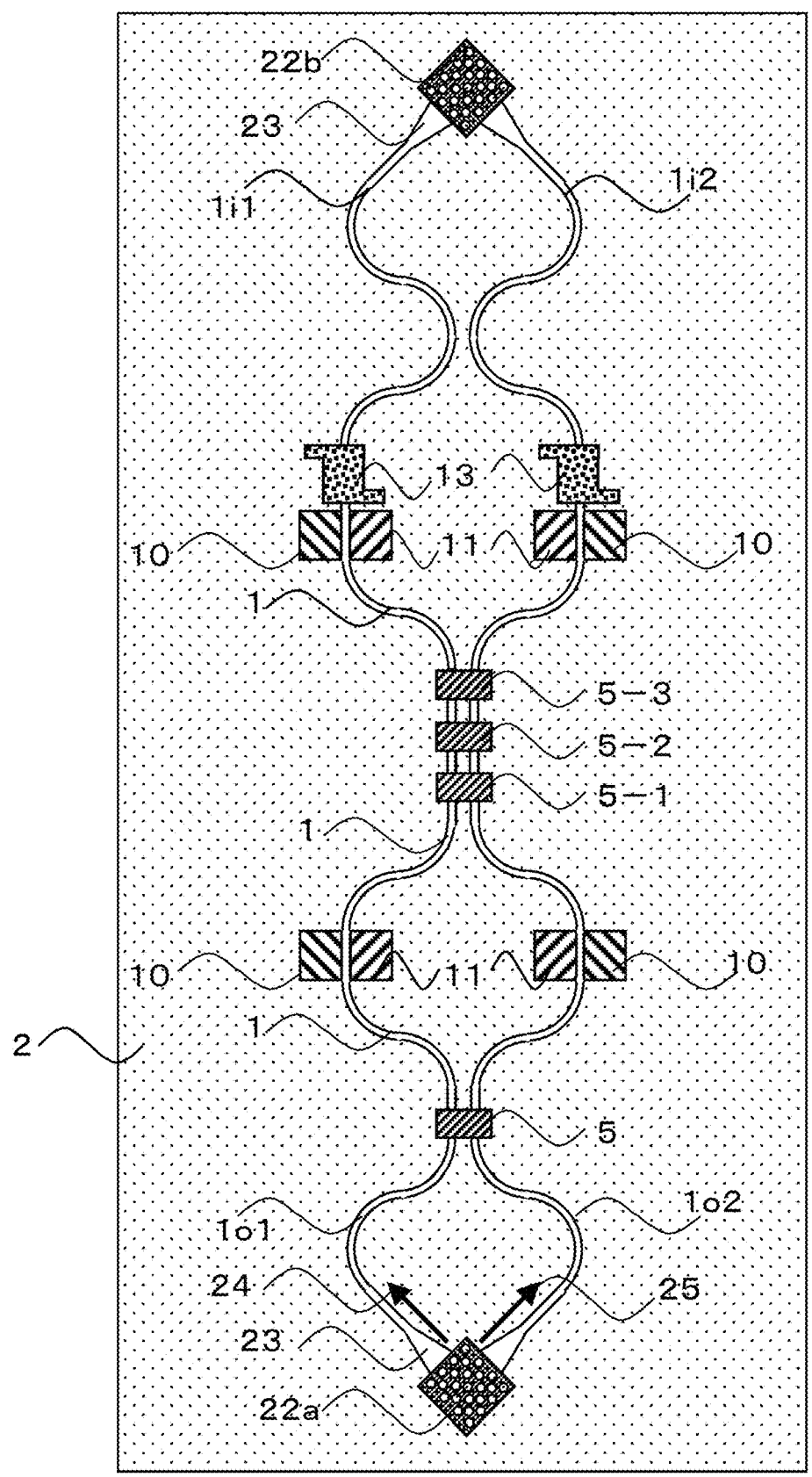
FIG. 10 is a plan view of a polarization modulator (a Poincare rotator)

FIG. 10 illustrates a Poincare rotator according to the embodiment. The 2-dimensional grating coupler 22 is rotated at 45° from the disposition of FIG. 9. Thus, it is easy to cause a left optical path length and a right optical path length to be equal. In adjustment of the overall phase, it is very important to cause the left optical path length to be equal to the right optical path length. The light incident on the chip from a 2-dimensional grating coupler 22a illustrated in FIG. 10 is emitted from a 2-dimensional grating coupler 22b to the outside of the chip via a phase modulator or the like, and is coupled with the optical fiber again. In the Poincare rotator, a propagation distance of the laser beam 24 which is emitted from the first output port $1o1$ of the grating coupler 22a and is incident on the first input port $1i1$ of the grating coupler 22b and a propagation distance of the laser beam 25 which is emitted from the second output port $1o2$ of the grating coupler 22a and is incident on the second input port $1i2$ of the grating coupler 22b are considered to be equal.

When diverse rules are imposed to manufacturing conditions of mask for lithography, a design rotated by 45° in this way is not allowed in some cases. In these cases, for example, one silicon thin line waveguide 1 may meander and the optical path length may be adjusted to be the same. Because of various manufacturing conditions or the like, an optical path difference actually occurs between the right and left optical path lengths despite the same optical path length in design in some cases. In these cases, the phase can also be adjusted by the phase shifter, for example, the temperature adjustment type phase shifter illustrated in FIGS. 6A and 6B or the phase shifter illustrated in FIGS. 4A and 4B. When the adjustment is performed by the phase shifter in this way, there is no problem although there is a difference between the left optical path length and the right optical path length by the silicon thin line waveguide 1.

Other than the 2-dimensional grating coupler 22, since substantially the same components as those of the first embodiment are used for the Poincare rotator according to the second embodiment, the chip can be generated in processes similar to those of the first embodiment. This chip can modulate the polarized state of the light to any polarized state at 25 Gbps.

The laser beam incident on the 2-dimensional grating coupler 22a is separated into the laser beam 24 emitted from the left output port $1o1$ and the laser beam 25 emitted from the right output port 102. Here, when polarized light of the light for propagating the laser beam 24 is linearly polarized light and the direction is horizontal for the polarized light, the state can be expressed as in Equation (13).

$$|H> = \begin{pmatrix} 1 \\ 0 \end{pmatrix} \quad (13)$$

Since the state of the laser beam 25 is vertical, the state is vertically polarized light, and thus the state can be expressed as in Equation (14).

$$|V\rangle = \begin{pmatrix} 0 \\ 1 \end{pmatrix} \quad (14)$$

The laser beams 24 and 25 are incident on the MZ modulator. In the MZ modulator according to the embodiment, the laser beam output from the phase modulator successively passes the three MMI optical waveguides 5-1 to 5-3 as in the MZ modulator of the first embodiment. Accordingly, the polarized state of the laser beam is changed to a state in which a rotating matrix described in Equation (11) in the column vectors indicating the polarized state is operated. Thus, a horizontally polarized state expressed in Equation (13) and a vertically polarized state expressed in Equation (14) can be a superposition state. Even when a base of the state is changed from Equation (1) or Equation (2) expressing a circularly polarized state to Equation (13) or Equation (14) expressing a linearly polarized state, any base can be just described as a sort of state known as the quantum mechanics. For example, when Equation (13) and Equation (14) are used as a base, Equation (1) and Equation (2) can be respectively expressed as Equation (15) and Equation (16).

$$|L\rangle = \frac{1}{\sqrt{2}} \begin{pmatrix} 1 \\ i \end{pmatrix} \quad (15)$$

$$|R\rangle = \frac{1}{\sqrt{2}} \begin{pmatrix} 1 \\ -i \end{pmatrix} \quad (16)$$

When an angle describing the superposition state of the states expressed in Equation (13) or Equation (14) is defined as 206 in the MZ modulator, a rotating matrix described in Equation (11) can be expressed as in Equation (17).

$$\begin{pmatrix} \cos(\alpha) & -\sin(\alpha) \\ \sin(\alpha) & \cos(\alpha) \end{pmatrix} \quad (17)$$

Here, the angle α is called an auxiliary angle. When $E_0$ is the amplitude of a complex electrical field of light, the angle α indicates an angle at which the x component is distributed to $E_x = E_0 \cos(\alpha)$ and the y component is distributed to $E_y = E_0 \sin(\alpha)$.

For example, when α=90° is satisfied, the horizontally polarized light (|H>) is converted into the vertically polarized light (|V>) and the vertically polarized light (|V>) is conversely converted into the horizontally polarized light (|H>). When α=45° is satisfied, the horizontally polarized light (|H>) is converted into a diagonal state (|D>) and the vertically polarized light (|V>) is converted into an anti-diagonal state (|A>). That is, the rotator rotating the Poincare sphere state is realized.

Normally, when the polarized state is rotated using a rotation plate or a wavelength plate, only rotation of the polarized state at a decided angle can be realized. Accordingly, when the polarized state is rotated at another angle, the rotation plate or the wavelength plate has to be replaced. In work for physically replacing the rotation plate or the wavelength plate, a time which is a macro time (several minutes) is necessary. Although the rotation plate or the wavelength plate is switched by an actuator capable of operating physically, it is very difficult to perform control at micro-second order. Furthermore, to adjust a rotation angle to any angle, many rotation plates or wavelength plates have to be prepared in advance and cost is considerable, which is not realistic.

In contrast, the Poincare rotator according to the embodiment can control a polarized state to any polarization angle by changing a voltage given to the modulator. Since an operation speed of 25 Gbps can be realized in the circuit according to the embodiment, a time necessary to switch the polarized state of the laser beam can be set to 0.04 ns.

Next, an operation of the Poincare rotator will be described with reference to FIG. 10. The laser beams passing through a first MZ modulator (the MMI optical waveguides 5-1 to 5-3 are successively incident on a second MZ modulator. The second MZ modulator adjusts a phase difference between the light incident on the left arm and the light incident on the right arm.

For example, a polarized state of the light after the light passes through the first MZ modulator is considered to be a state of Equation (18).

$$|\alpha, 0\rangle = \begin{pmatrix} \cos(\alpha) \\ \sin(\alpha) \end{pmatrix} \quad (18)$$

When the phase modulator in the second MZ modulator does not give a phase to the left arm and gives a phase δ to the right arm, the finally obtained polarized state becomes Equation (19).

$$|\alpha, \delta\rangle = \begin{pmatrix} \cos(\alpha) \\ e^{i\delta}\sin(\alpha) \end{pmatrix} \quad (19)$$

When the input laser beam 24 in the horizontally polarized state (|H>) expressed in Equation (13) is incident and the input laser beam 25 is not incident, it is possible to realize any output polarized state. That is, the passing through the phase modulator of the second MZ modulator is equivalent to passing of the light through the phase plate.

For example, when an application voltage to the phase shifter is adjusted so that δ=180° is satisfied, the state of |L> expressed in Equation (15) can be converted into the state of |R> expressed in Equation (16). That is, a polarized state can be inverted from the counterclockwise circularly polarized light to the clockwise circularly polarized light. This is equivalent to calculation by a so-called half-wave plate.

When an application voltage to the phase shifter is adjusted so that δ=90° is satisfied, the state of |L> (the counterclockwise circularly polarized light) expressed in Equation (15) can be converted into an anti-diagonal state of the linearly polarized light in a −45° direction which is expressed in Equation (20).

$$|A\rangle = \frac{1}{\sqrt{2}} \begin{pmatrix} 1 \\ -1 \end{pmatrix} \quad (20)$$

On the other hand, the state (clockwise circularly polarized light) of |R> expressed in Equation (16) can be converted into a diagonal state of the linearly polarized light in a 45° direction which is expressed in Equation (21).

$$|D> = \frac{1}{\sqrt{2}}\begin{pmatrix}1\\1\end{pmatrix} \quad (21)$$

This is equivalent to calculation by a so-called quarter-wave plate.

By setting the magnitude of the phase difference δ given in the second MZ modulator voluntarily, it is possible to make a change to any polarized state. The laser beams of which the polarized states are operated in this way can be combined again by the 2-dimensional grating coupler 22b, can be emitted in the vertical direction to the chip, and can be directly coupled with an optical fiber. After connected to two optical fibers via a spot-size converter such as a 1-dimensional grating coupler or a tapered waveguide, an optical lens, or the like without using the 2-dimensional grating coupler 22, the laser beams may be coupled to one optical fiber by a fiber-shaped directional coupler.

The Poincare rotator disclosed in the embodiment can convert the polarized state of the laser beam in any polarized state at a high speed. Different pieces of digital information can correspond to the different polarized states. Therefore, by causing the digital signals to correspond to four different phases in each state of the horizontally polarized light (|H>) and the vertically polarized light (|V>), it is possible to transmit a total of δ pieces of digital information at a transmission speed of 25 Gbps. This corresponds to transmission in which a communication speed is 200 Gbaud.

The Poincare rotator illustrated in FIG. 10 has a structure in which the laser beam is incident on the 2-dimensional grating coupler 22 in a direction vertical to the chip. This structure is a structure in which it is easy to inspect a non-defective product or a defective product of the manufactured chip, but there is concern of physical interference between access to an electrode pad and fiber coupling. For example, when an operation is performed at a high speed up to an operation area in which a transmission speed exceeds 40 Gbps, the chip and a driver circuit are preferably subjected to flip-chip bonding, but it is difficult to adopt the mounting form. Actually, a forefront optical transceiver exceeding 100 Gbps is put into practical use. Thus, to increase a speed, it is necessary to optimize both fiber coupling and electrode coupling.

Figure 11:
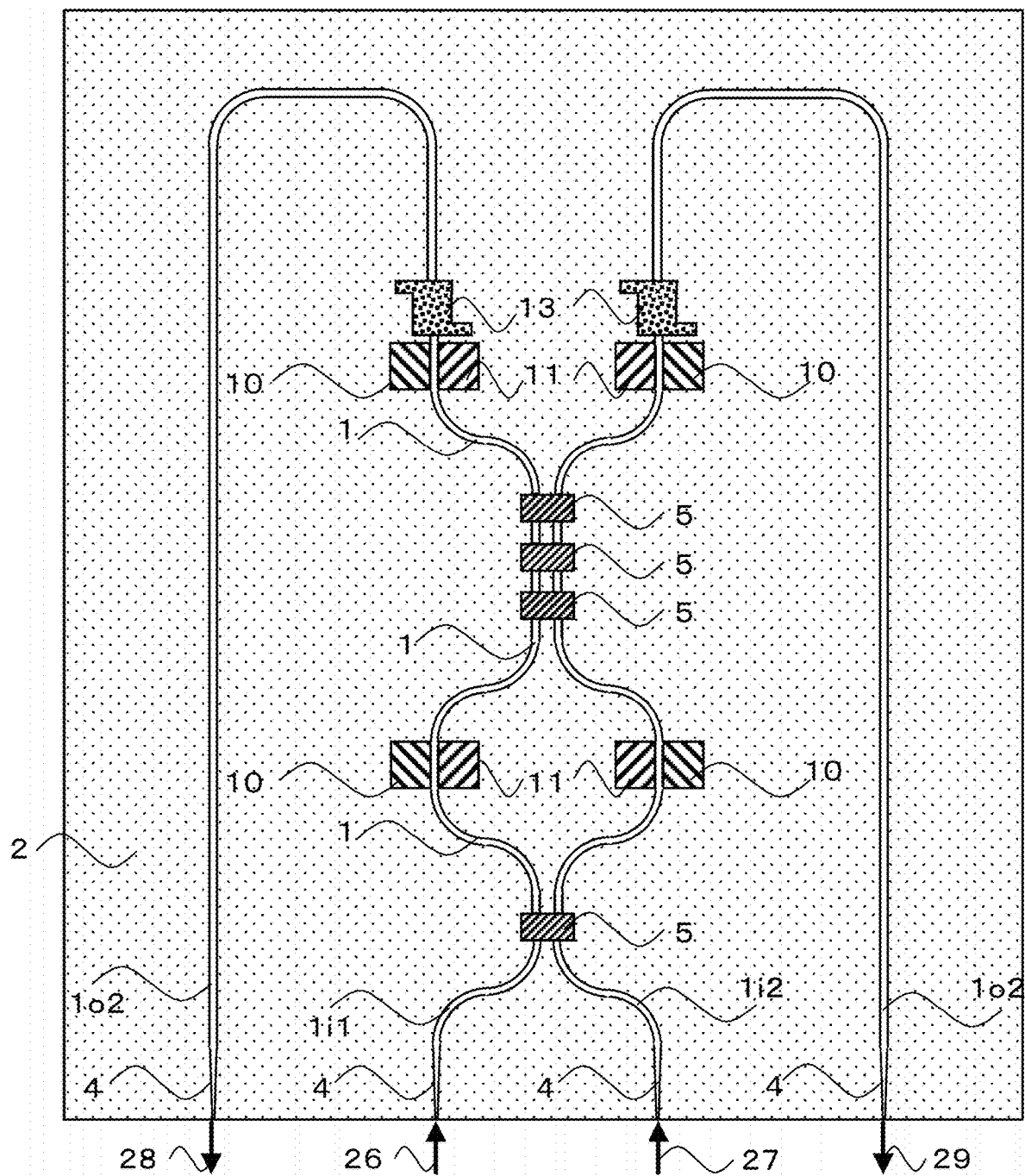
FIG. 11 is a plan view of a polarization modulator (a Poincare rotator)

As a modified example, a Poincare rotator in which integration is facilitated with high-efficient coupling using a fiber array is illustrated in FIG. 11. In this structure, high-efficient coupling can be realized with the fiber array by coupling an input and an output of a fiber at the same end surface. By disposing the tapered silicon thin line waveguides 4 at an interval of 250 μm, high-efficient coupling with the fiber array can be performed using a known optical fiber. A laser beam 26 is incident from the first input port 1i1, a laser beam 27 is incident from the second input port 1i2, and a laser beam of which a polarized state is rotated by the Poincare rotator is separated into a laser beam 28 to be emitted from the first output port 1o1 and a laser beam 29 to be emitted from the second output port 1o2.

After input light is separated into a horizontally polarized light (|H>) component and a vertically polarized light (|V>) component in advance using a known polarization splitter (not illustrated) and the components are combined by a polarization maintenance fiber or the like, it is necessary to combine the components with the Poincare rotator illustrated in FIG. 11. Similarly, the laser beams 28 and 29 which are output light correspond to mutually orthogonal polarized states. Therefore, after a process opposite to the above-described input, that is, output light is combined with the polarization maintenance fiber or the like, it is necessary to combine the laser beams 28 and 29 in the orthogonal polarized states. This can be easily realized using known optical components.

In the modified example, since connection from the end surface of the chip to the optical fiber can be made, the electrode and the driver circuit are directly subjected to flip-chip bonding (not illustrated). Thus, even when a modulation speed exceeds 40 Gbps, the modulator can be operated.

Third Embodiment

In the first and second embodiments, the optical modulator that makes the superposition state of two orthogonal angular momentum states of light at a high speed has been described. In a third embodiment, a receiver that receives light in a superposition state will be described. Since the optical modulator described in the first and second embodiments has time-reversal symmetry, an optical receiver can have a substantially similar configuration.

To generate the optical receiver, a material absorbing light is necessary. Here, germanium (Ge) which is closely familiar with silicon processing like silicon and is a group 4 element was used. Any material other than germanium may be used as long as the material is a material absorbing light in accordance with a wavelength band to be used.

Figure 12A:
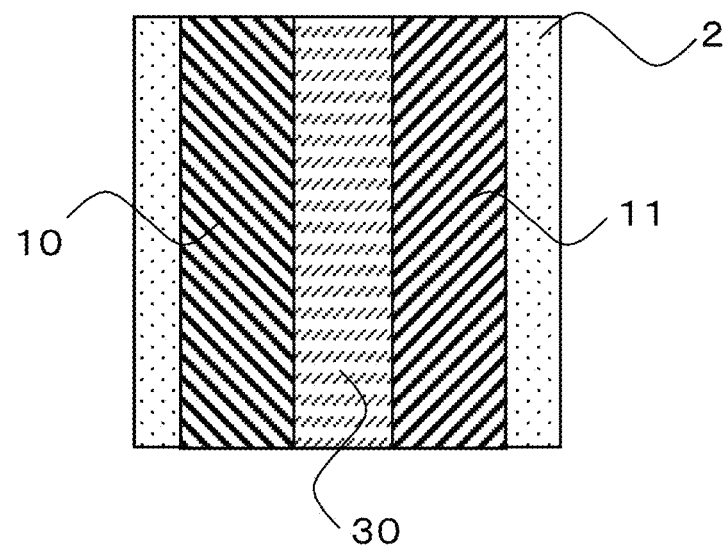
FIG. 12A is a plan view of a germanium light receiver.
Figure 12B:
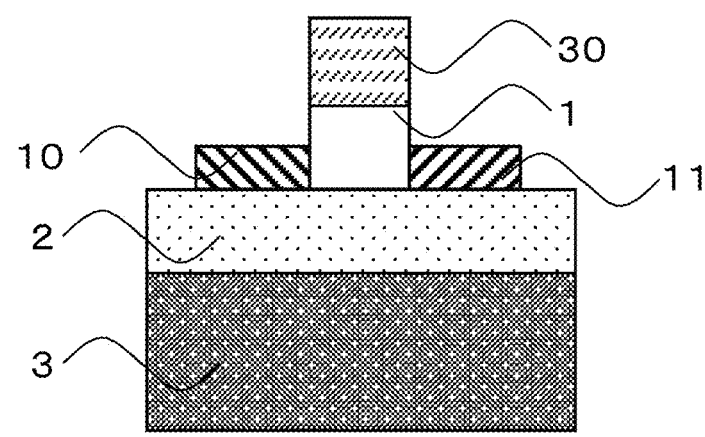
FIG. 12B is a sectional view of the germanium light receiver.

FIGS. 12A and 12B are respectively a plan view and a sectional view of a germanium light receiver 30. After the p-type doped silicon 10 and the n-type doped silicon 11 are activated, desired regions of the upper clad silicon dioxide 12 can be opened by a photolithography apparatus and a dry etching apparatus and germanium can be selectively grown to form the germanium light receiver 30. The subsequent processes are similar.

Figure 13:
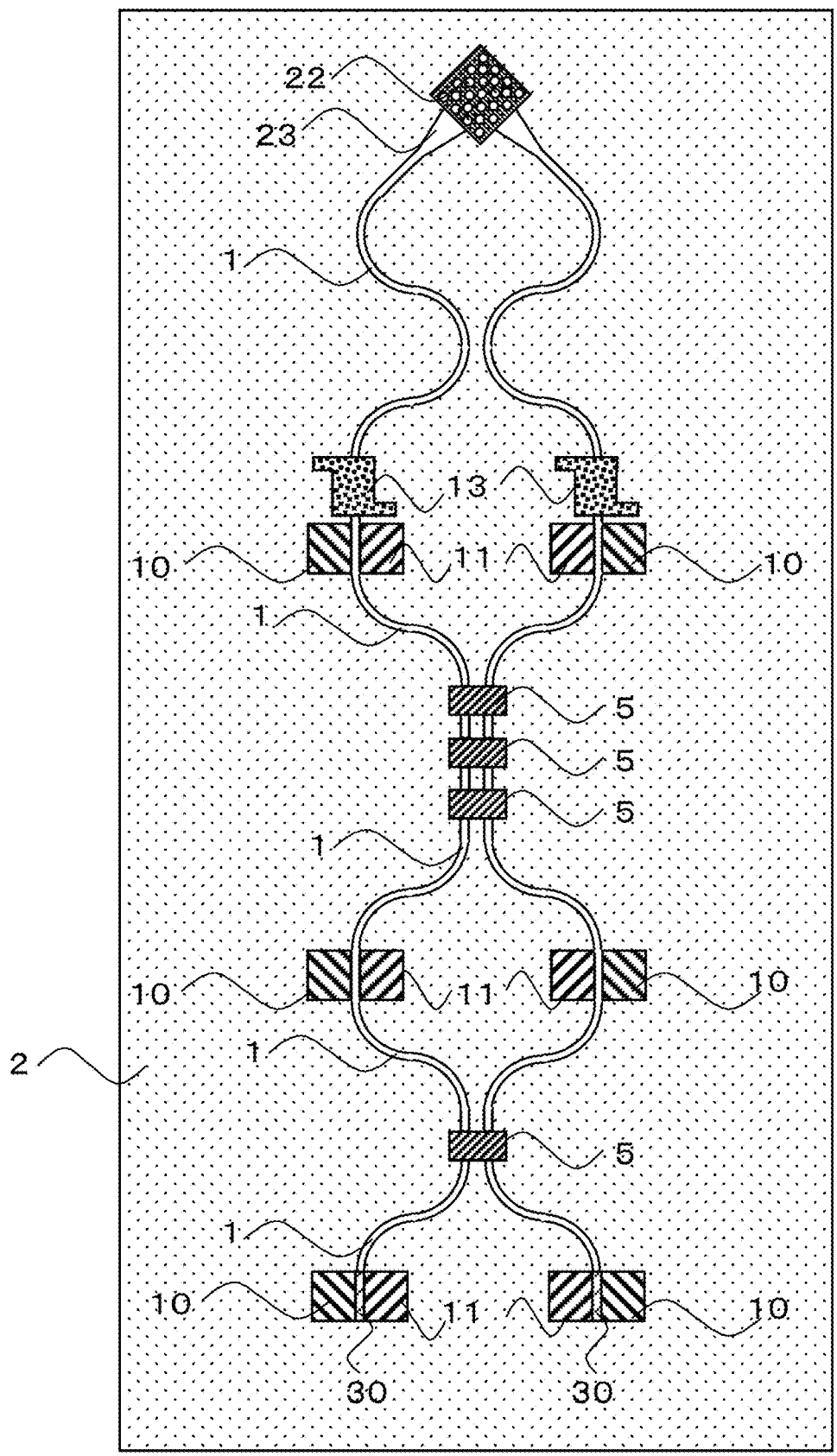
FIG. 13 is a plan view of an optical receiver.

FIG. 13 illustrates an optical receiver which is a reception device. The device in FIG. 13 is a reception device when an optical modulator on a transmission side is a device (the polarization modulator of the second embodiment) that controls spin angular momentum states of light. Light from the optical modulator is incident on the 2-dimensional grating coupler 22, is subjected to completely opposite processes to those of the optical modulator, and is converted into a polarized state desired to be detected, and then the converted light is received by the germanium light receiver 30, and thus is detected as a current flowing between the p-type doped silicon 10 and the n-type doped silicon 11.

Similarly, when the optical modulator on the transmission side is a device (the optical vortex modulator of the first embodiment) controlling the orbital angular momentum state of the light, the grating-coupled ring waveguide gear 14 may be coupled with the silicon thin line waveguide 1 instead of the 2-dimensional grating coupler 22 and the light from the optical modulator may be incident on the grating-coupled ring waveguide gear 14.

The optical receiver in FIG. 13 can detect states in which the angular momenta of the light are completely different, that is, two orthogonal states of quantum mechanics.

Further, when more different angular momentum states are detected including non-orthogonal states, the light may be divided into a plurality of light beams with the angular momentum states of the light maintained and then the separated light beams may be incident on the plurality of optical receivers before the light from the optical modulator is incident on the 2-dimensional grating coupler 22 or the grating-coupled ring waveguide gear 14. Since the optical receivers according to the embodiment can be manufactured using the silicon processing and many optical integrated circuits can be manufactured at low cost, easy realization is possible.

The optical receiver according to the embodiment can perform a high-speed operation of 40 Gbps. In such a high-speed operation, it is important to connect the germanium light receiver 30 directly to the silicon thin line waveguide 1 for compact configuration.

A voltage to be applied to the phase modulator of the optical receiver may be constant. Alternatively, high-speed modulation may be performed and angular momentum states extracted between bits may be dynamically changed.

Fourth Embodiment

The optical modulator of the first and second embodiments includes the phase modulator that changes the angular momentum states of light by performing an electrical operation. Such a modulator is a generic term of so-called active elements. In a fourth embodiment, however, a spin angle-orbital angle conversion device that converts a polarized state (that is, the spin angular momentum state) of light into an orbital angular momentum state of the light without performing an electrical operation is disclosed. An element on which the electrical operation is not performed is called a passive element.

Figure 14:
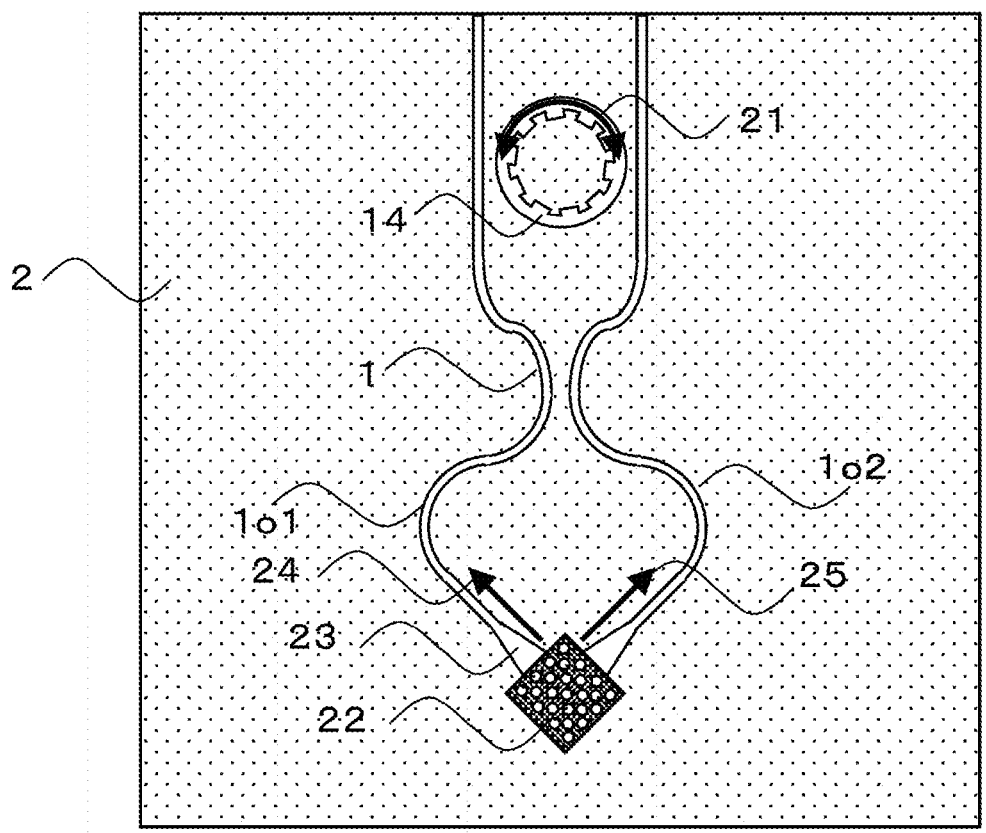
FIG. 14 is a plan view of a spin angle-orbital angle conversion device.

The spin angle-orbital angle conversion device according to the fourth embodiment is illustrated in FIG. 14. The laser beam vertically incident on the 2-dimensional grating coupler 22 from the optical fiber is separated into the laser beam 24 to be emitted from the first output port 1$o$1 and the laser beam 25 to be emitted from the second output port 1$o$2. The laser beams 24 and 25 have a mutually orthogonal linearly polarized mode. Further, in the laser beams 24 and 25, not only is an intensity ratio between polarized components of the original incident light maintained, but phase information is also maintained. Actually, an optical loss is caused by the 2-dimensional grating coupler 22 or the tapered silicon thin line waveguide 23 due to deviation of a design value in some cases. However, since the same loss is added to both the orthogonal modes, there is no problem occurring in device characteristics.

The laser beams 24 and 25 each propagate through the silicon thin line waveguide 1 and are coupled with the grating-coupled ring waveguide gear 14. Thus, a laser beam 21 in a superposition state of the counterclockwise rotation and the clockwise rotation is generated in the ring waveguide 14. As a result, the laser beam which is in the superposition state of the orthogonal angular momentum states is emitted in a direction vertical to the SOI substrate.

Here, when the spin angular momentum state is converted into the angular momentum state accurately without using an active element, an optical path length in the coupling from the 2-dimensional grating coupler 22 to the grating-coupled ring waveguide gear 14 is necessarily identical between the right and left arms. Therefore, in an element manufacturing process, it is important to make an effort to maintain minimum alignment deviation or the like in the processing in terms of manufacturing. A temperature adjustment type phase modulator that compensates for deviation in the optical path length may be provided to electrically adjust the phase.

The laser beams 24 and 25 propagating through the silicon thin line waveguide 1 have a phase and amplitude as quantized states of polarized light of the original incident light described in Equation (19). An upper component of a column vector of Equation (19) indicates a state of the light (the laser beam 24) coupled from the left side and a lower component of the column vector of Equation (19) indicates a state of the light (the laser beam 25) coupled from the right side. The states of the laser beams 24 and 25 are generated actively by the MZ modulator and the phase modulator in the optical vortex modulator of the first embodiment and are the same as the states of the laser beams incident on the left waveguide 1L and the right waveguide 1R.

Accordingly, the superposition state of the orbital angular momentum states (the left vortex state and the right vortex state) can be realized without using an active element in the spin angle-orbital angle conversion device according to the embodiment. The quantized states indicated as optical vortexes are described in Equation (19). Here, in this case, the upper component of the column vector of Equation (19) indicates a left vortex state and the lower component of the column vector of Equation (19) indicates a right vortex state. In this way, it is possible to realize a spin angle-orbital angle momentum converter that converts the spin angular momentum state of the light into the orbital angular momentum state of the light.

An angular momentum state analysis device disclosed in the third embodiment may detect the converted optical vortexes, as necessary. Before the laser beam is incident on the spin angle-orbital angle momentum converter, the polarized states may be controlled using the Poincare rotator disclosed in the second embodiment.

In the embodiment, the conversion from the spin angular momentum state to the orbital angular momentum state has been described. However, because of the time-reversal symmetry, the orbital angular momentum state can be converted into the spin angular momentum state with the same element configuration. To convert the orbital angular momentum state into the spin angular momentum state, the light obtained by causing the laser beams in the superposition state of the orbital angular momentum states to be incident on the grating-coupled ring waveguide gear 14 and output from the 2-dimensional grating coupler 22 becomes the laser beam in the superposition state of the spin angular momentum states.

Fifth Embodiment

In a fifth embodiment, a spin orbital direct product state generation device that realizes any spin angular momentum state and any orbital angular momentum state by controlling both a spin angular momentum state (a polarized state) and an orbital angular momentum state will be described.

Figure 15:
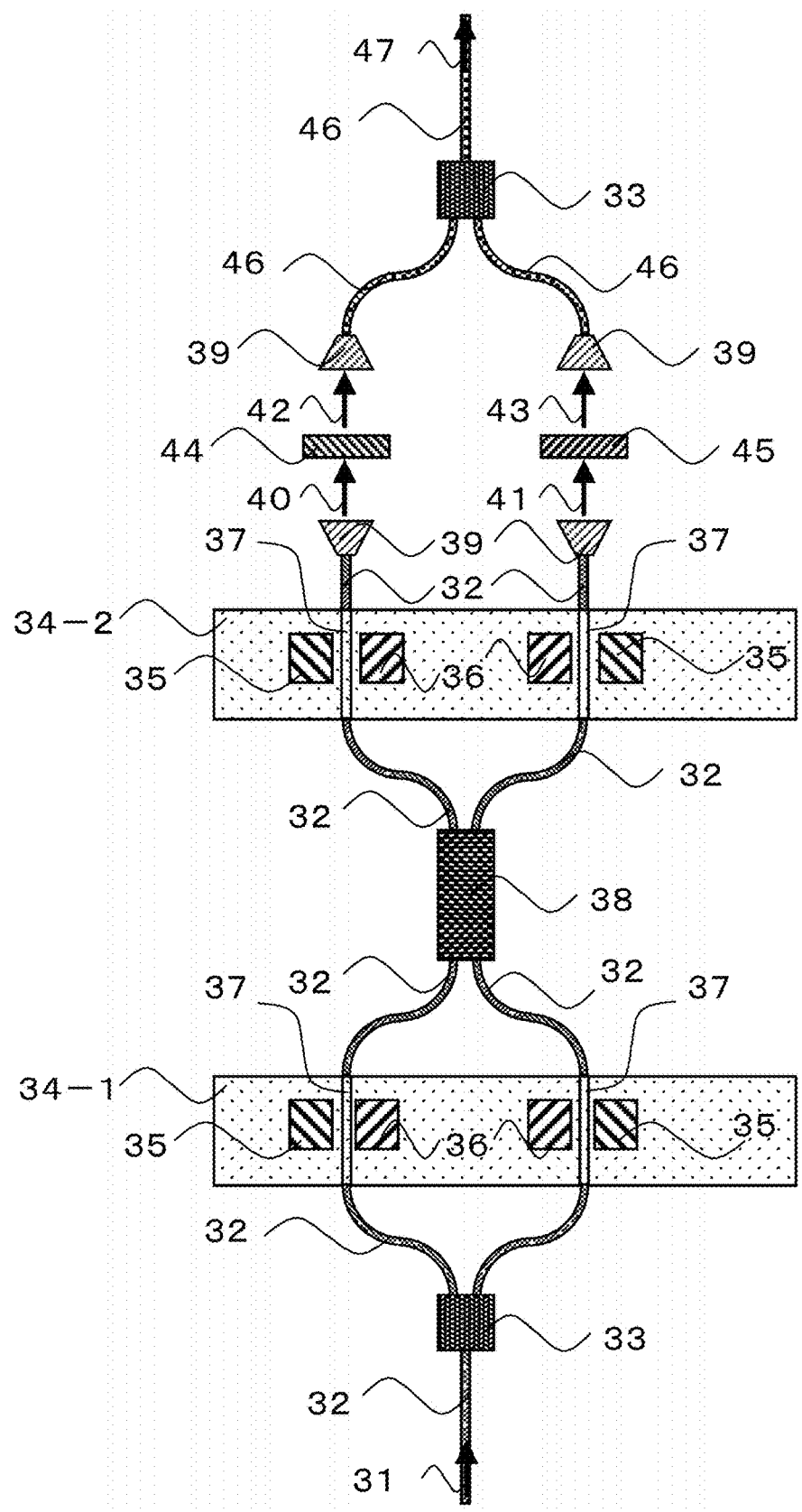
FIG. 15 is a diagram illustrating a configuration of a spin orbital direct product state generation device.

FIG. 15 illustrates the spin orbital direct product state generation device according to the embodiment.

First, any polarized state of a laser beam oscillated by a laser light source (not illustrated) is realized by the Poincare rotator described in the second embodiment or another method. At this time, when the orbital angular momentum of the light is not excited, the laser beam is in a quantized state satisfying $|\theta, \phi\rangle$ expressed in Equation (4). Here, $\theta$ and $\phi$ respectively indicate a polar angle and an azimuth angle on the Poincare sphere illustrated in FIG. 1.

The laser beam in the polarized state (the spin angular momentum state) controlled in this way is set as an input laser beam 31 illustrated in FIG. 15. Here, a single-mode optical fiber 32 is used as a waveguide of the laser beam 31.

A phase of the single-mode optical fiber 32 is sensitive to temperature or a length of a fiber. However, a stable polarized state can be maintained by appropriately inserting a distortion application type fiber controller, a temperature controller, or the like (not illustrated).

The single-mode optical fiber 32 is connected to a 1×2 fiber coupler 33 to separate the input light into right and left beams. Here, a fiber coupler which does not depend on polarized light and is capable of separating light at a ratio of 50%:50% is used. In this way, it is preferable to realize a configuration in which the polarized state $|\theta, \phi\rangle$ is not changed as much as possible. However, even when a polarized state is changed using a mirror or the like, there is no problem in a temporary change in the polarized state as long as the changed polarized state is returned to the original polarized state.

As the 1×2 fiber coupler 33, a fiber coupler designed to output a phase similar to that of the general MMI optical waveguide 5 of $L=3L_\pi/2$ adopted in the first embodiment is used. When there is a deviation from a design value, a phase modulator, a fiber expansion or contraction device, or the like may be used to adjust the phase.

Subsequently, the single-mode optical fiber 32 which is an output of the fiber coupler 33 is coupled with a ridge waveguide 37 formed on a first LiNbO$_3$ substrate 34-1. A ground electrode 35 or a signal electrode 36 is formed to be adjacent to the ridge waveguide 37, so that the phase of the laser beam propagating in the ridge waveguide 37 can be modulated. In the coupling of the optical fiber 32 and the ridge waveguide 37, it is preferable to use a lens (not illustrated) or the like or form a structure of a spot-size converter or the like at an end surface to increase coupling efficiency. The optical fiber 32 may be formed a lensed spherical fiber to process the end surface of a fiber.

In the example of FIG. 15, the configuration is used in which two phase modulators that each include the ridge waveguide 37 are mounted on one LiNbO$_3$ substrate 34, but a configuration may be used in which the phase modulator is mounted on each of two LiNbO$_3$ substrates 34. A phase modulator or a silicon modulator that includes a LiNbO$_3$ waveguide formed on a silicon substrate may be used rather than the LiNbO$_3$ substrate 34. Here, the phase modulator preferably has no polarization dependence. Therefore, in FIG. 15, the LiNbO$_3$ modulator that has no polarization dependence is used. However, when a modulator that has polarization dependence is used, a change in the polarized state occurring in the modulator may be eliminated by a polarization controller formed by a phase plate or a rotator. As the polarization controller, the Poincare rotator of the second embodiment is suitable. This is because the Poincare rotator can perform any rotation in the Poincare sphere.

The single-mode optical fiber 32 which is an output from the phase modulator is further coupled with a 2×2 fiber coupler 38. The 2×2 fiber coupler 38 includes two input ports and two output ports. As the 2×2 fiber coupler 38, a fiber coupler designed to output a phase similar to that of the general MMI optical waveguide 5 of $L=9L_\pi/2$ adopted in the first embodiment is used. When there is a deviation from the design value, a phase may be adjusted using a phase modulator, a fiber expansion or contraction device, or the like, as in the fiber coupler 33.

In this way, the MZ modulator is configured by combining the LiNbO$_3$ modulator, the optical fiber, and the fiber coupler. Thus, it is possible to adjust amplitude between the laser beam propagating through the left fiber and the laser beam propagating through the right fiber. The amplitude control is used to control an optical orbital angular momentum. A parameter indicating this control is described using $\Theta$ (capital letter) to distinguish with a small letter $\theta$ describing a spin angular momentum.

A laser beam output from the 2×2 fiber coupler 38 propagates through the single-mode optical fiber 32 and is incident on the ridge waveguide 37 on a second LiNbO$_3$ substrate 34-2. By applying a desired voltage to the ground electrode 35 and the signal electrode 36, phases of the right and left laser beams are independently controlled.

Here, the ground electrode 35 and the signal electrode 36 of the LiNbO$_3$ modulator can be processed in various shapes. When modulation is performed at a high speed, it is preferable to provide terminating resistance of 50Ω (not illustrated) as a progressive wave electrode (a traveling waveguide). However, when the terminating resistance of 50Ω is provided, power consumption increases. Therefore, it is preferable that the terminating resistance be not provided from the viewpoint of a low-power consumption operation. In this case, by processing the ridge waveguide 37 of LiNbO$_3$ to have a width of about 500 nm or less using a silicon-on-LiNbO$_3$ substrate instead of the LiNbO$_3$ substrate 34 and approximating the ridge waveguide 37 to the electrodes to increase the intensity of light and apply a high electrical field, the lengths of the ground electrode 35 and the signal electrode 36 can be set to about 500 μm or less. Therefore, the terminating resistance becomes unnecessary.

The phases of the laser beams propagating through the right and left optical fibers can be controlled with the phase modulators formed on the second LiNbO$_3$ substrate 34-2. A parameter indicating this phase control is described using $\Phi$ (capital letter) to distinguish with a small letter $\phi$ describing a spin angular momentum.

A collimate lens 39 is coupled with the single-mode optical fiber 32 from which the laser beam with the modulated phase is emitted, and a laser beam 40 from the left fiber and a laser beam 41 from the right fiber are emitted as parallel beams in a space. Here, the spin angular momentum states of the laser beams 40 and 41 are maintained together as the state described in Equation (4).

By causing the laser beam 40 from the left fiber to be incident on a left vortex generation plate 44, an orbital angular momentum is excited to generate a laser beam 42 in a left vortex state. By causing the laser beam 41 from the right fiber to be incident on a right vortex generation plate 45, an orbital angular momentum is excited to generate a laser beam 43 in a right vortex state.

Here, the optical vortex generation plate is a sort of optical component and generates a desired optical vortex by transmitting or reflecting light. An example of the optical vortex generation plate is a dielectric film in which a film thickness distribution is inclined in a rotational direction of a concentric circle. When a circle goes once and an inclination is adjusted so that a phase deviates by $2\pi$ accurately, a quantized vortex of ±1 can be formed as vorticity. It is important for the deviation of the phase to be an integral multiple of $2\pi$ and the integer value is a quantum number of the vortex. A liquid crystal is used as an optical vortex generation plate. However, in this case, since the spin angular momentum state has a spatial distribution, attention is necessary. A device capable of electrically controlling a desired vortex by controlling a voltage of a pixel may be used.

The reason why the film thickness distribution of the dielectric film is used as the optical vortex generation plate is that a left vortex generator can be used as a right vortex generator by inverting the front and the back, and conversely the right vortex generator can be used as the left vortex generator by inverting the front and the back.

The laser beams 42 and 43 are each incident on the collimate lens 39 to be coupled with a multi-mode optical fiber 46. The laser beams incident on the multi-mode optical fiber 46 are combined by the 1×2 fiber coupler 33 to generate a laser beam 47 in a spin orbital direct product state propagating through one multi-mode optical fiber 46.

The direct product state of the laser beam 47 in the spin orbital direct product state is expressed in Equation (22).

$$|\theta, \phi\rangle \otimes |\Theta, \Phi\rangle \quad (22)$$

Here, $|\theta, \phi\rangle$ indicates a spin angular momentum state described in Equation (4) and $|\Theta, \Phi\rangle$ indicates an orbital angular momentum state described in Equation (23).

$$|\Theta, \Phi\rangle = \begin{pmatrix} e^{-i\frac{\Phi}{2}} \cos\left(\frac{\Theta}{2}\right) \\ e^{i\frac{\Phi}{2}} \sin\left(\frac{\Theta}{2}\right) \end{pmatrix} \quad (23)$$

In this way, the direct product state can be expressed with four angles (θ, φ) and (Θ, Φ), and thus it can be understood that the spin angular momentum state and the orbital angular momentum state can be independently controlled.

For example, when the spin angular momentum state is counterclockwise circularly polarized light and the orbital angular momentum state is the right vortex state, this state can be expressed as in Equation (24). Similarly, when the spin angular momentum state is clockwise circularly polarized light and the orbital angular momentum state is the left vortex state, this state can be expressed as in Equation (25).

$$|L\text{-spin}\rangle \otimes |R\text{-orbit}\rangle \quad (24)$$

$$|R\text{-spin}\rangle \otimes |L\text{-orbit}\rangle \quad (25)$$

Further, by preparing two spin orbital direct product state generation devices in FIG. 15 and combining laser beams output from these devices using a fiber coupler, a spatial optical system, or the like, it is also possible to realize new superposition state of the spin orbital direct product state. The states are a singlet state expressed in Equation (26) and a triplet state expressed in Equation (27).

$$|L\text{-spin}\rangle \otimes |R\text{-orbit}\rangle - |R\text{-spin}\rangle \otimes |L\text{-orbit}\rangle \quad (26)$$

$$|L\text{-spin}\rangle \otimes |R\text{-orbit}\rangle + |R\text{-spin}\rangle \otimes |L\text{-orbit}\rangle \quad (27)$$

The singlet state or the triplet state is also called an entangled state and indicates that different quantized states such as a spin and an orbit are closely correlated. In this state, the clockwise circularly polarized state is eliminated when a laser beam in the entangled state is caused to pass through a polarization plate or the like to extract only the counterclockwise circularly polarized state. At this time, the state of the laser beam is described in Equation (23) and the orbital angular momentum state is determined as a right vortex state. Conversely, when the clockwise circularly polarized light is extracted, the state of the laser beam at this time is described in Equation (24) and the orbital angular momentum state is determined as a left vortex state.

In the related art, to realize such entangled light, it is considered that it is necessary to handle weak light at a single photon level. In contrast, entanglement of quantum mechanics can also be realized for macro light by using the device that controls a spin angular momentum state and an orbital angular momentum state of light, as described in the fifth embodiment. This is called a macroscopic entanglement state.

Because a macroscopic entanglement state can be realized with a laser beam which is not at a single photon level, an operation on a quantized state can become considerably simple. When a single photon disappears at the single photon level, further quantum measurement or quantum calculation cannot be implemented. In an actual experiment, various losses occur. Therefore, handling a single photon was a bottleneck of practical use of a quantum computer. In the present invention, a quantized state can be maintained in a macroscopic laser beam. Therefore, quantum measurement or quantum calculation can be continued although a loss occurs. Since a normal photodiode or the like can be used to detect light, an experiment can be carried out considerably easily compared to a scheme of using a single photon with a superconducting detector or the like. Of course, in the device according to the present invention, there is no problem although the intensity of a laser beam is lowered and an experiment is carried out at a single photon level.

In the fifth embodiment, the example in which the device is configured using the discrete optical element has been described. However, the device may be generated using the silicon photonics as in the first to fourth embodiments. Conversely, in the first to fourth embodiments, the device can also be configured using the discrete optical elements used in the fifth embodiment.

What is claimed is:

1. An optical modulator that generates a coherent laser beam in a superposition state of two orthogonal angular momentum states, the optical modulator comprising:
   a first waveguide;
   a second waveguide;
   a first phase shifter provided in one or both of the first and second waveguides and configured to control a phase of the laser beam incident on the waveguide;
   a first optical element configured to combine the laser beam propagating through the first waveguide and the laser beam propagating through the second waveguide and separate the combined laser beam into two laser beams;
   a third waveguide on which one of the laser beams separated by the first optical element is incident;
   a fourth waveguide on which the other of the laser beams separated by the first optical element is incident;
   a second phase shifter provided in one or both of the third and fourth waveguides and configured to control a phase of the laser beam incident on the waveguide; and
   a second optical element configured to combine the laser beam propagating through the third waveguide and the laser beam propagating through the fourth waveguide and emit the laser beam in the superposition state of the two orthogonal angular momentum states.

2. The optical modulator according to claim 1,
   wherein, when θ is a phase difference provided between the phase of the laser beam propagating through the first waveguide and the phase of the laser beam propagating through the second waveguide,
   the first optical element separates the combined laser beam so that a ratio of intensity of the laser beam incident on the third waveguide to intensity of the laser beam incident on the third waveguide becomes $\cos^2(\theta/2) : \sin^2(\theta/2)$.

3. The optical modulator according to claim 1, further comprising:
a third optical element configured to separate an incident laser beam into two laser beams with identical intensity,
wherein one of the laser beams separated by the third optical element is incident on the first waveguide and the other of the laser beams separated by the third optical element is incident on the second waveguide.

4. The optical modulator according to claim 3,
wherein the first and third optical elements are multimode interference optical waveguides, and
wherein the third optical element is formed by connecting the three first optical elements in series or a length of a waveguide of the third optical element is designed to an optimum value of when the length of the waveguide is three times a length of a waveguide of the first optical element.

5. The optical modulator according to claim 1, further comprising:
a temperature adjustment type phase shifter provided in one or both of the third and fourth waveguides and configured to adjust a phase of the laser beam propagating through the waveguide.

6. The optical modulator according to claim 1,
wherein the angular momentum state is an orbital angular momentum state,
wherein a laser beam with an identical phase and intensity to the laser beam incident on the first waveguide is incident on the second waveguide,
wherein the second optical element is a ring waveguide disposed between the third and fourth waveguides, and
wherein an inner circumference of the ring waveguide has a periodic structure and a period of the periodic structure has magnitude which is an integral multiple of a wavelength of the laser beam in the ring waveguide.

7. The optical modulator according to claim 1,
wherein the angular momentum state is a spin angular momentum state, and
wherein a laser beam in a spin angular momentum state orthogonal to the laser beam incident on the first waveguide is incident on the second waveguide.

8. The optical modulator according to claim 7,
wherein the second optical element is a coupler of photonic crystal with a rectangular planar shape, and
wherein the third waveguide is coupled with a first side surface of the coupler and the fourth waveguide is coupled with a second side surface adjacent to the first side surface of the coupler.

9. The optical modulator according to claim 7, further comprising:
a fifth waveguide;
a sixth waveguide on which a laser beam in a spin angular momentum state orthogonal to a laser beam incident on the fifth waveguide is incident; and
a third optical element configured to combine the laser beam propagating through the fifth waveguide and the laser beam propagating through the sixth waveguide and separate the combined laser beam into two laser beams with identical intensity,
wherein one of the laser beams separated by the third optical element is incident on the first waveguide and the other of the laser beams separated by the third optical element is incident on the second waveguide,
wherein the first to sixth waveguides are formed on a substrate;
wherein the third to sixth waveguides are each connected to a spot-size converter provided on a predetermined end surface of the substrate, and
wherein the second optical element is coupled with an optical fiber connected to the third and fourth waveguides via the spot-size converter.

10. A quantum computer in which the superposition state of the angular momentum states according to claim 1 is formed as quantum bits.

11. An optical receiver that receives a coherent laser beam in a superposition state of two orthogonal angular momentum states, the optical receiver comprising:
a first optical element on which light in any angular momentum state is incident and which is configured to separate the light into two laser beams in the two orthogonal angular momentum states;
a first waveguide on which one of the laser beams from the first optical element is incident;
a second waveguide on which the other of the laser beams from the first optical element is incident;
a first phase shifter provided in one or both of the first and second waveguides and configured to control a phase of the laser beam incident on the waveguide;
a second optical element configured to combine the laser beam propagating through the first waveguide and the laser beam propagating through the second waveguide and separate the combined laser beam into two laser beams;
a third waveguide on which one of the laser beams separated by the second optical element is incident;
a fourth waveguide on which the other of the laser beams separated by the second optical element is incident;
a second phase shifter provided in one or both of the third and fourth waveguides and configured to control a phase of the laser beam incident on the waveguide;
a third optical element configured to combine the laser beam propagating through the third waveguide and the laser beam propagating through the fourth waveguide and separate the combined laser beam into two laser beams;
a fifth waveguide on which one of the laser beams separated by the third optical element is incident;
a sixth waveguide on which the other of the laser beams separated by the third optical element is incident;
a first receiver configured to detect the laser beam propagating through the fifth waveguide; and
a second receiver configured to detect the laser beam propagating through the sixth waveguide.

12. The optical receiver according to claim 11,
wherein the second and third optical elements are multimode interference optical waveguides,
wherein, when the laser beam is incident on the fifth wavelength and no laser beam is incident on the sixth wavelength, the third optical element is designed to separate the laser beam incident on the fifth wavelength into two laser beams with identical intensity and cause the laser beams to be incident on the third and fourth waveguides, and
wherein the second optical element is formed by coupling the three third optical elements or a length of the waveguide of the second optical element is designed to an optimum value of when the length of the waveguide is three times a length of the waveguide of the third optical element.

13. The optical receiver according to claim 11,
wherein the first optical element is a ring waveguide disposed between the first and second waveguides, and
wherein an inner circumference of the ring waveguide has a periodic structure and a period of the periodic structure has magnitude which is an integral multiple of a wavelength of the laser beam in the ring waveguide.

14. The optical receiver according to claim 11,
wherein the first optical element is a coupler of photonic crystal with a rectangular planar shape, and
wherein the first waveguide is coupled with a first side surface of the coupler and the second waveguide is coupled with a second side surface adjacent to the first side surface of the coupler.

15. A conversion device that converts a coherent laser beam in a superposition state of orthogonal spin angular momentum states into a coherent laser beam in a superposition state of orthogonal orbital angular momentum states or converts a coherent laser beam in a superposition state of orthogonal orbital angular momentum states into a coherent laser beam in a superposition state of orthogonal spin angular momentum states, the conversion device comprising:
a coupler of photonic crystal with a rectangular planar shape;
a first waveguide coupled with a first side surface of the coupler;
a second waveguide coupled with a second side surface adjacent to the first side surface of the coupler; and
a ring waveguide disposed between the first and second waveguides,
wherein an inner circumference of the ring waveguide has a periodic structure and a period of the periodic structure has magnitude which is an integral multiple of a wavelength of the laser beam in the ring waveguide.

16. The conversion device according to claim 15, wherein a first optical path length between the coupler and the ring wavelength in the first waveguide is identical to a second optical path length between the coupler and the ring waveguide in the second waveguide.

17. A spin orbital direct product state generation device comprising:
a first waveguide on which a coherent laser beam in a superposition state of two orthogonal spin angular momentum states is incident;
a first optical element configured to separate the laser beam propagating through the first waveguide into two laser beams with identical intensity;
a second waveguide on which one of the laser beams from the first optical element is incident;
a third waveguide on which the other of the laser beams from the first optical element is incident;
a first phase shifter provided in one or both of the second and third waveguides and configured to control a phase of the laser beam incident on the waveguide;
a second optical element configured to combine the laser beam propagating through the second waveguide and the laser beam propagating through the third waveguide and separate the combined laser beam into two laser beams;
a fourth waveguide on which one of the laser beams separated by the second optical element is incident;
a fifth waveguide on which the other of the laser beams separated by the second optical element is incident;
a second phase shifter provided in one or both of the fourth and fifth waveguides and configured to control a phase of the laser beam incident on the waveguide;
a third optical element on which the laser beam propagating through the fourth waveguide is incident and which is configured to emit the laser beam in a first angular momentum state;
a fourth optical element on which the laser beam propagating through the fifth waveguide is incident and which is configured to emit the laser beam in a second angular momentum state orthogonal to the first angular momentum state; and
a fifth optical element configured to combine the laser beam in the first angular momentum state and the laser beam in the second angular momentum state.

18. The spin orbital direct product state generation device according to claim 17, wherein the third and fourth optical elements are optical vortex generation plates.

19. The spin orbital direct product state generation device according to claim 17, wherein a length of the waveguide of the second optical element is designed to an optimum value of when the length of the waveguide is three times a length of the waveguide of the first optical element.

* * * * *